US007847977B2

(12) United States Patent
Yano et al.

(10) Patent No.: US 7,847,977 B2
(45) Date of Patent: Dec. 7, 2010

(54) APPARATUS FOR DETERMINING RESPECTIVE AMOUNTS OF RESPECTIVE RECORDING MATERIALS USED IN REPRODUCING A COLOR DEFINED BY COLOR SIGNALS

(75) Inventors: Fumiko Yano, Tokyo (JP); Hitoshi Nishikori, Tokyo (JP); Daisaku Ide, Tokyo (JP); Takeshi Yazawa, Yokohama (JP); Jun Yasutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 11/763,833

(22) Filed: Jun. 15, 2007

(65) Prior Publication Data

US 2007/0291311 A1 Dec. 20, 2007

(30) Foreign Application Priority Data

Jun. 19, 2006 (JP) ............................. 2006-169087

(51) Int. Cl.
*H04N 1/40* (2006.01)
(52) U.S. Cl. ........................ 358/2.1; 358/1.9; 358/500
(58) Field of Classification Search .................. 358/1.1, 358/1.9, 500, 501, 502, 515, 518, 520
See application file for complete search history.

(56) References Cited

U.S. PATENT DOCUMENTS

| 4,597,794 | A | 7/1986 | Ohta et al. .................... 106/20 |
| 5,085,698 | A | 2/1992 | Ma et al. ....................... 106/20 |
| 5,231,131 | A | 7/1993 | Chu et al. .................... 524/504 |
| 5,272,201 | A | 12/1993 | Ma et al. ..................... 524/505 |
| 6,949,138 | B2 * | 9/2005 | Nakamura et al. .......... 106/401 |
| 2002/0175983 | A1 | 11/2002 | Ishikawa et al. ............ 347/100 |

FOREIGN PATENT DOCUMENTS

| EP | 0 556 649 A1 | 8/1993 |
| JP | 6-228476 A | 8/1994 |
| JP | 7-247452 A | 9/1995 |
| JP | 7-268261 A | 10/1995 |
| JP | 2002-069340 A | 3/2002 |
| JP | 2006088660 A * | 4/2006 |

* cited by examiner

*Primary Examiner*—Thomas D Lee
(74) *Attorney, Agent, or Firm*—Fitzpatrick, Cella, Harper & Scinto

(57) ABSTRACT

To provide a prepared color separation table for an inkjet printing apparatus that suppresses unevenness due to differences in the color of regular reflected light when a printing medium surface used for printing pigment-based inks is irradiated with light and which can output a high quality image. It is a printing apparatus that can carry out printing using recording materials and when reproducing a color of a predetermined color region using numerous types of the said recording materials with different regular reflected light colors it uses at least one type of the recording materials over the entire area in the predetermined color region.

3 Claims, 27 Drawing Sheets

APPARATUS FOR DETERMINING RESPECTIVE AMOUNTS OF RESPECTIVE RECORDING MATERIALS USED IN REPRODUCING A COLOR DEFINED BY COLOR SIGNALS

BACKGROUND OF THE INVENTION

1. Field of the Invention

This invention pertains to an image processing apparatus and printing apparatus that record images by using a recording material.

2. Description of the Related Art

Heretofore there have been many instances in which dyes stably dissolved in water as the main component have been used as the coloring material in the ink which has water as the principal component used in inkjet printing apparatus. Because the molecules in these dyes absorb light one by one, the colors become brighter. Further, because of permeation into and adsorption onto the receiving layers of special printing media, the surface properties of the printing media maintain their coloring intact. However, the color material in the dye ink (dye-based ink) exists in molecular form. As a result, there are the problems that the color material in the dye-based ink easily migrates in the printing medium after printing, color fixing is slow and because of light or gas it is easy for it to break down and color degradation occurs easily.

In recent years the necessity for improving the color fixing directly after printing and ameliorating the resistance characteristics of environmental adverse affect or waterproofing properties of the printing materials has increased. In order to respond to this, inkjet printing apparatus using ink that utilizes pigments in the color material (pigment-based ink) have been developed. Because the color material in pigment-based ink exists as particles, the color material is slow to migrate in the printing medium after printing and the color fixing is fast. Additionally, even if the molecules on the surface of the color material granules break down due to light or gas, because the molecules inside them contribute to the color fixing, color degradation occurs with difficulty.

However, especially when printing with pigment-based ink, the phenomenon sometimes occurs in which the color of regular reflected light reflected onto the printing components differs from the color of the original lighting and the color of the ink used in the printing. This phenomenon is called the "bronze phenomenon". This "bronze" phenomenon in particular noticeably occurs when printing on a printing medium that has a high gloss.

This bronze phenomenon can be quantitatively measured. For example, using a three dimensional Gonio-spectrophotometric Color Measurement System (GCMS-4) from Murakami Color Research Laboratory, it is possible to measure the color of regular reflected light with respect to a single color patch printed with pigment-based ink on glossy paper by irradiating with light from a 45° direction and receiving it at an opposite 45° position.

FIG. 22 is a diagram showing this measuring system in typical form. In FIG. 22, B0001 indicates the illumination means by which the printing medium B0003, the object of evaluation, is illuminated. B0002 indicates the photodetecting means by which the reflected light from B0003, the object of evaluation, is detected. The photodetecting means B0002 is positioned inclined to the same angle $\psi$ as the illumination means on the opposite side with respect to the normal line direction of the printing medium B0003, that is, it is placed in the normal reflection direction. B0004 indicates the fixed base to which the printing medium B0003 is affixed on which the targeted patch which is the evaluation target is printed. B0005 indicates the measuring site that the photodetecting means B0002 will measure. B0006 indicates the light shielding means that screens out light from outside.

Next, an explanation of the method for calculating the bronze characteristics from the measured regular reflected light of the printing medium will be given. The tristimulus values $X_X Y_Y X_Z$ are calculated from the spectral intensity $$R_X(\lambda) \quad \text{[Number 1]}$$

according to the following equation (1) of the regular reflected light from the printing medium B0003 measured by the photodetecting means B002

[Number 2]

$$Xx = \int_{380}^{780} Rx(\lambda)\bar{x}(\lambda)d\lambda \quad (1)$$
$$Yx = \int_{380}^{780} Rx(\lambda)\bar{y}(\lambda)d\lambda$$
$$Zx = \int_{380}^{780} Rx(\lambda)\bar{z}(\lambda)d\lambda$$

However, when measuring the regular reflected light with the optical system of FIG. 22 with equation (1) above, because of the high degree of gloss on glossy paper, the range of the measured values of the regular reflected light approach the measurements of the light source. That is to say, it is similar to the measuring system in which the light from the light source is directly measured. Accordingly, unlike calculation of the tristimulus values of the color of the object from normal reflection, the spectral intensity of the regular reflected light is considered as the relative spectral distribution of the light source and obeys the calculation method for the tristimulus values of the light-source color.

$$\bar{x}(\lambda), \bar{y}(\lambda), \bar{z}(\lambda) \quad \text{[Number 3]}$$

of equation (1) are the color matching functions of JISZ8782. Also, normalization by multiplication of the proportional constant is not performed here but normalization by multiplying with

[Number 4]

$$K = \frac{100}{\int_{380}^{780} \bar{y}(\lambda)d\lambda} \quad (2)$$

may be performed.

With the white board of the perfectly diffused reflector as the measurement target, from the spectral intensity $$S(\lambda) \quad \text{[Number 5]}$$

of the illuminator B0001 measured by measuring the spectral intensity of its regular reflected light with B0002, the illumination tristimulus values $X_S$, $Y_S$ and $Z_S$ are calculated from equation (3) below. Equation (3) is based on the calculation method for the tristimulus values of the light-source color and is a conversion equation that calculates the tristimulus values $X_S$, $Y_S$ and $Z_S$ from the spectral data of the above-mentioned illumination.

[Number 6]

$$Xs = k \int_{380}^{780} S(\lambda)\bar{x}(\lambda)d\lambda$$
$$Ys = k \int_{380}^{780} S(\lambda)\bar{y}(\lambda)d\lambda \quad (3)$$
$$Zs = k \int_{380}^{780} S(\lambda)\bar{z}(\lambda)d\lambda$$

The $$\bar{x}(\lambda), \bar{y}(\lambda), \bar{z}(\lambda) \quad \text{[Number 7]}$$

of equation (3) are the color matching functions of JISZ8782. Additionally, the k of equation (3) is the proportional constant and the value of $Y_S$ of the tristimulus value is determined so as to agree with the photometric quantity.

Next, the regular reflected light L*a*b* values of B0003 based on JIS Z8729 are calculated from the tristimulus values $X_X$, $Y_X$ and $Z_X$ of the regular reflected light of the printing medium B0003, which is the evaluation targets detected by B0002, and the tristimulus values $X_S$, $Y_S$ and $Z_S$ of the illuminator B0001. In this regard, the tristimulus values ($X_X$, $Y_X$ and $Z_X$) of the regular reflected light of B0003 are used in the values of X, Y and Z, and the tristimulus values ($X_S$, $Y_S$ and $Z_X$) of the light source are used in the values of $X_n$, $Y_n$ and $Z_n$ in equations (1) through (4) of JIS Z8729. That is, the a* and b* values are calculated by equation (4) below.

[Number 8]

$$a^* = 500\left[f\left(\frac{Xx}{Xs}\right) - f\left(\frac{Yx}{Ys}\right)\right]$$
$$b^* = 200\left[f\left(\frac{Yx}{Ys}\right) - f\left(\frac{Zx}{Zs}\right)\right]$$

Here,

When $\frac{Xx}{Xs} > 0.008856$, $$f\left(\frac{Xx}{Xs}\right) = \left(\frac{Xx}{Xs}\right)^3$$

When $\frac{Xx}{Xs} \leq 0.008856$, $$f\left(\frac{Xx}{Xs}\right) = 7.78\frac{Xx}{Xs} + \frac{16}{116}$$

When $\frac{Yx}{Ys} > 0.008856$, $$f\left(\frac{Yx}{Ys}\right) = \left(\frac{Yx}{Ys}\right)^{\frac{1}{3}}$$

When $\frac{Yx}{Ys} \leq 0.008856$, $$f\left(\frac{Yx}{Ys}\right) = 7.78\frac{Yx}{Ys} + \frac{16}{116}$$

When $\frac{Zx}{Zs} > 0.008856$, $$f\left(\frac{Zx}{Zs}\right) = \left(\frac{Zx}{Zs}\right)^{\frac{1}{3}}$$

When $\frac{Zx}{Zs} \leq 0.008856$, $$f\left(\frac{Zx}{Zs}\right) = 7.78\frac{Zx}{Zs} + \frac{16}{116}$$

(4)

Because the bronze is related not to the brightness of the image of the reflected illumination but to its color, the L* values which indicate brightness are not used for evaluation. In this detailed statement only the a*b* values in the CIELab color space are used in evaluation of the bronze characteristics.

FIG. 23 shows the bronze characteristics of various pigment-based inks and displays the measured results of 9 appropriately possible pigment-based inks for this invention in a*b* values. Various single colored patches on which various pigment-based inks of cyan, magenta, yellow, second black, light cyan, light magenta, red, green and gray were printed were measured by the measuring system for the regular reflected light mentioned above and the a*b* values were calculated from the above equation with the measured results. It is also a figure in which the a*b* values calculated in the above manner are plotted on an a*b* plane. In FIG. 23 the origin expresses the light-source color. Furthermore, the lines extending from the origin indicate by way of example the lines for the yellow, red and green hues in the color gamuts from the above-described measuring system. Additionally, as will be explained in an embodiment described hereafter, first black is used in highly concentrated regions and is an ink seldom added to other inks at the same pixel and is not shown in FIG. 23. The bronze characteristics are expressed by the a*b* values which signify the colors of the regular reflected light (hue·saturation).

As shown in FIG. 23, the reflected light of the cyan ink printed patch, for example, is observed as having a tinged with red to it. Moreover, this red is observed as a vivid red because of the large distance from the origin. Also, the reflected light of the second black patch is observed as a color tinged with yellow. Thus, the bronze phenomenon is a phenomenon in which the color measured by the system for regular reflected light differs both from the color of the original illuminated light and the color of the ink itself.

Ink manufacturing improvements as countermeasures to inks already existing have been implemented with respect to this bronze phenomenon (cf. Japanese Patent Laid-Open No. 6-228476, Japanese Patent Laid-Open No. 7-247452, Japanese Patent Laid-Open No. 7-268261, Japanese Patent Laid-Open No. 2002-69340). However, actually there are almost no cases in which only ink with complete suppression of the bronze phenomenon has been applied. This is because of the limitations in the ink application range due to various factors such as an affinity with the discharge characteristics of the printing head causing discharge of the ink or an affinity with the printing medium and ink manufacturing costs.

As explained in FIG. 23, there are instances in which, depending on the type of ink, the bronze color is perceived as being different. Consequently, in regions in which numerous types of inks are mixed and expressed, there are instances in which different bronze colors are perceived. For example, when expressing specific color gamuts using inks with different bronze colors (colors of the regular reflected light), it is easy to perceive the differences in the bronze colors in the vicinity of the sections in which the combination of the inks used changes. At this time, when the bronze hues on both sides are close, no noticeable sense of incongruity is produced in the above-mentioned changed sections but when the bronze hues on both sides are largely different, a sense of incongruity is produced because of the differences in the bronze color in the above-mentioned changed sections. A sense of incongruity from the differences in the bronze color in these changes sections is perceived visibly as "bronze unevenness".

FIG. 25A shows a conventional example in which the cyan-black hues using cyan ink and black ink are expressed. In FIG. 23 the bronze color of the cyan ink is tinged with red and the bronze hue of the second black ink is tinged with yellow. Consequently, in components in which cyan ink is predominantly used, the bronze is red and in parts in which the cyan ink is reduced and become a single black ink color, the bronze abruptly switches from red to yellow. Therefore, when the color region in the vicinity of this transformation reappears, "uneven color" due to the differences in the bronze colors is created and generally even when the perceived "uneven color" of the ink coloration itself is suppressed, a negative image effect is triggered which gives a sense of incongruity to those with a fine eye for color.

SUMMARY OF THE INVENTION

This invention was devised in order to resolve the above stated problems and has as its objective the providing of an image processing apparatus and printing apparatus that can output images in which bronze unevenness is suppressed.

Therefore, according to the present invention, a printing apparatus for carrying out printing using recording materials, wherein at least one type of the recording materials is used over the entire area within a color of a predetermined color region when reproducing the predetermined color region using a plurality of types of the recording materials which have different colors of regular reflected light.

Furthermore, an image processing apparatus; comprising a processing means for carrying out processing for determining the amount of a recording material used in reproducing a color defined by color signals, the processing means determining the amount of a plurality of types of recording materials used to reproduce the color defined by the color signal in a color of a predetermined color region so that at least one type of the recording materials is used over the entire area of the predetermined color region in which a plurality of types of recording materials with different regular reflected light colors are used for reproduction.

According to this invention, bronze unevenness is suppressed and it is possible to output a high quality image.

Further features of present invention will become apparent from the following description of exemplary embodiments (with reference to the attached drawings).

DESCRIPTION OF THE EMBODIMENTS

An explanation of the embodiments of this invention is given below referencing the figures. First, definitions of the terminology used in this detailed statement will be given.

Figure 22:
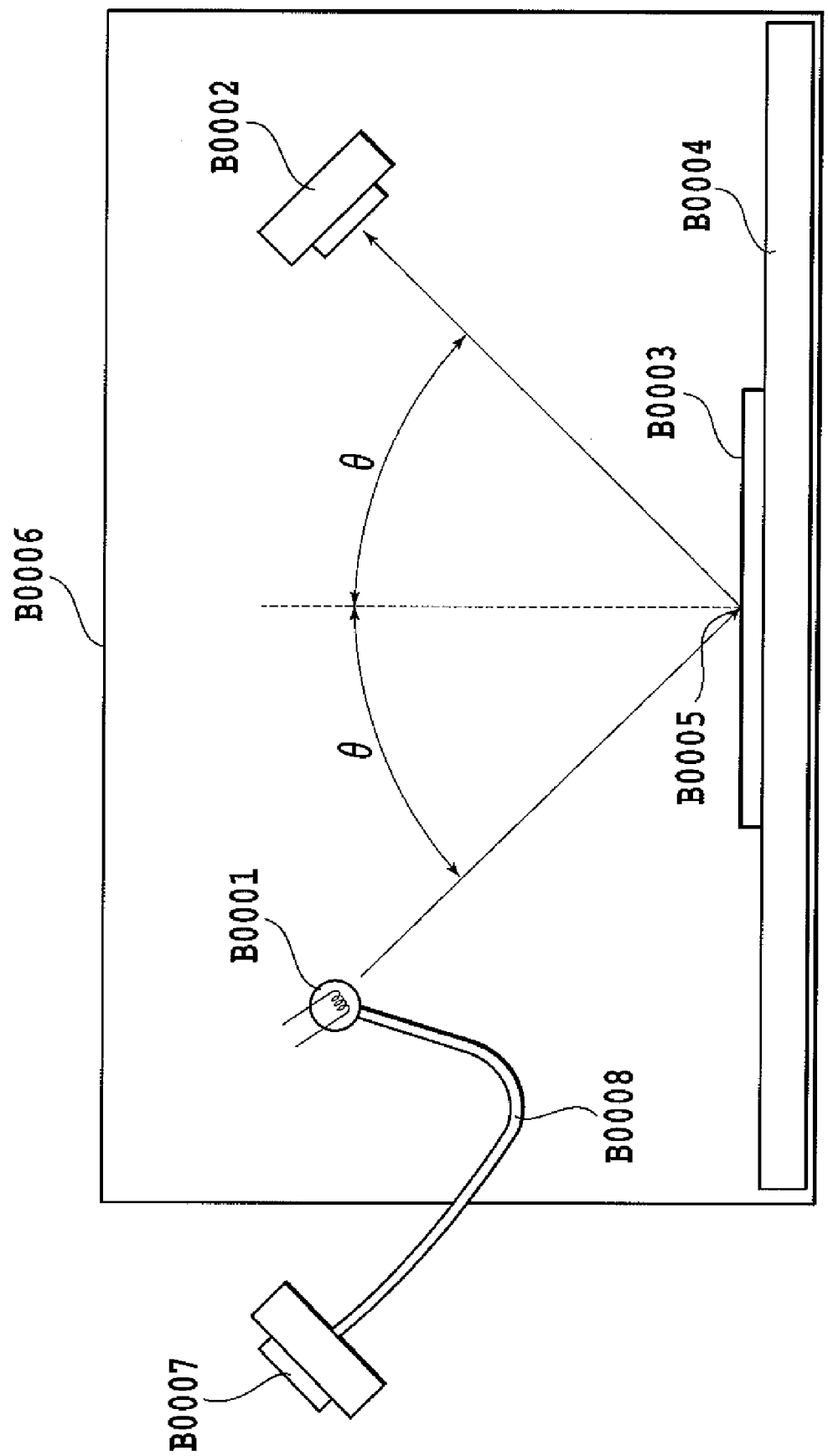
FIG. 22 is a schematic view showing the optical system of the bronze characteristics measuring device used in the embodiments of this invention.
Figure 23:
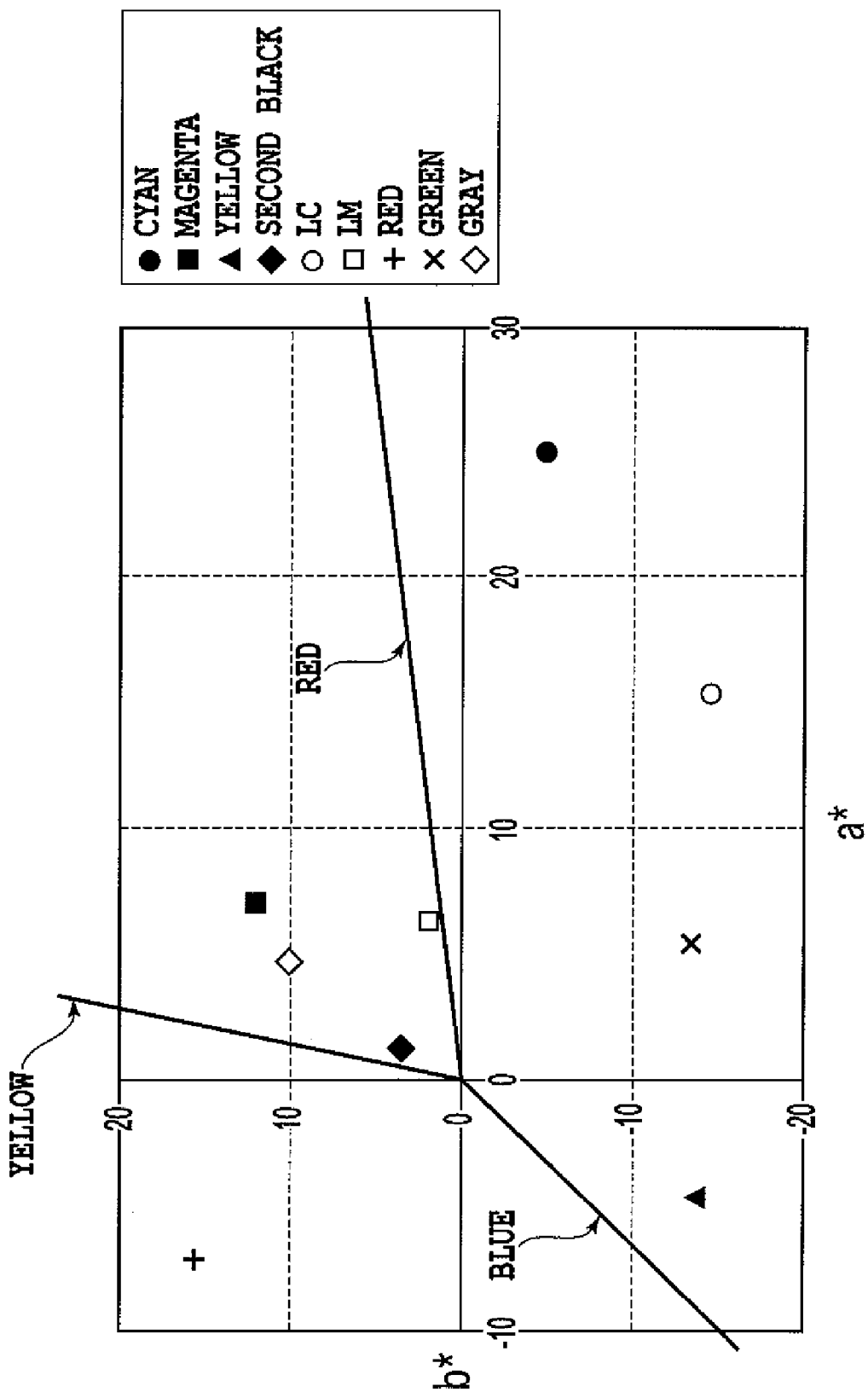
FIG. 23 is an example of the measurement results of the bronze characteristics used in the embodiments of this invention.

"The color of regular reflected light" as explained while referencing FIGS. 22 and 23 represents the a*b* values calculated using the intensity of the regular reflected light obtained by applying light to the printing part on the printing medium on which the recording material (e.g. ink) is printed and the equations (1) to (4) described above. From these a*b* values the hue and saturation ($C^* = \{(a^*)^2 + (b^*)^2\}^{1/2}$) of the regular reflected light are found. Furthermore, the bronze unevenness due to changes in the above-mentioned bronze color is principally due to hue differences in this regular reflected light. Saturation differences also have an effect on bronze unevenness but the magnitude of this effect is not to the extent of that of the hue difference.

Furthermore, "bronze color" or "bronze hue" is synonymous with "regular reflected light".

Descriptions will be provided below for embodiments of the present invention by referring to the drawings.

1. Basic Configuration 1.1 Outline of Printing System

Figure 1:
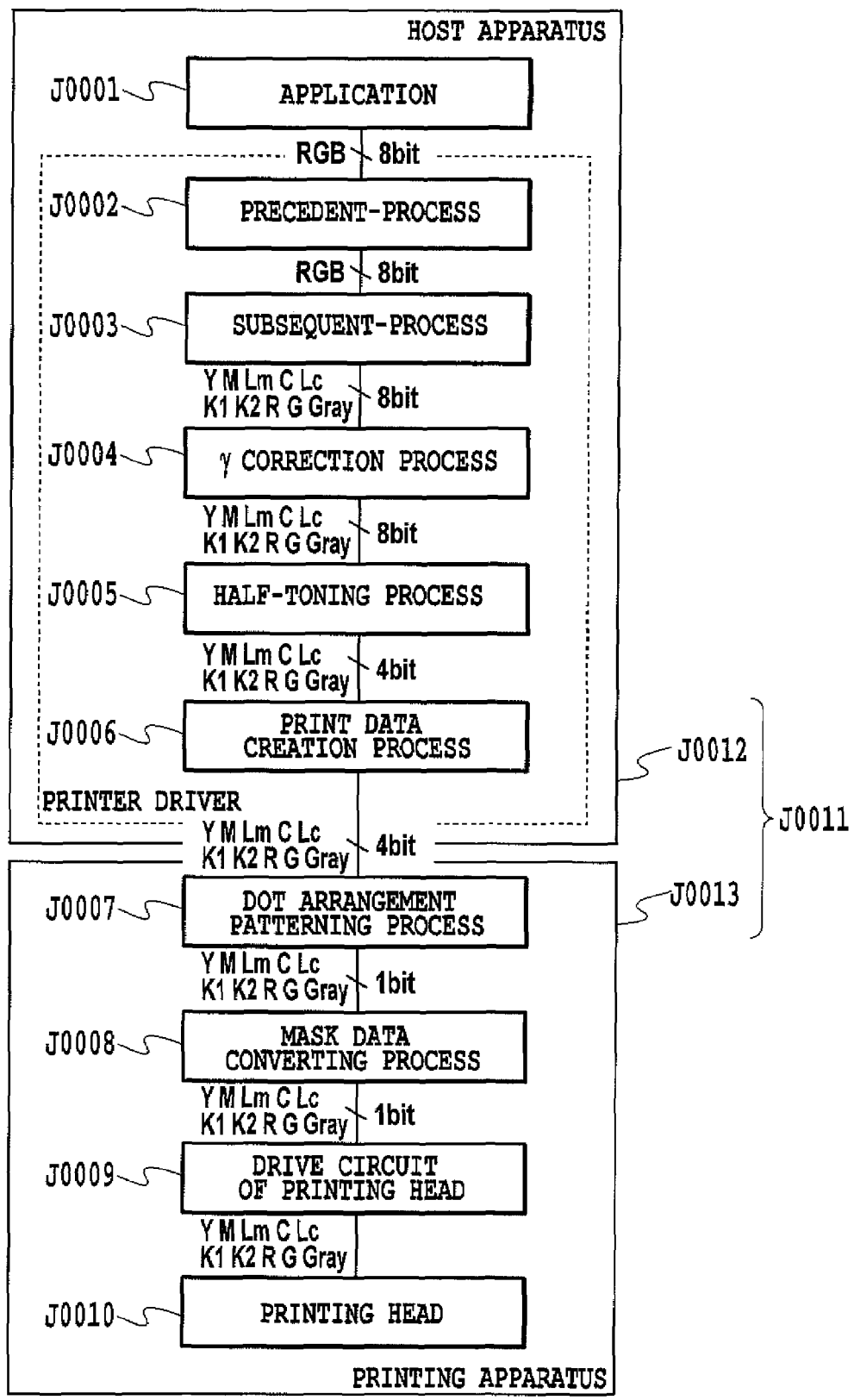
FIG. 1 is a diagram for explaining a flow in which image data are processed in a printing system to which an embodiment of the present invention is applied.

FIG. 1 is a diagram for explaining a flow in which image data are processed in a printing system to which an embodiment of the present invention is applied. This printing system J0011 includes a host apparatus J0012 which generates image data indicating an image to be printed, and which sets up a user interface (UI) for generating the data and so on. In addition, the printing system J0011 includes a printing apparatus J0013 which prints an image on a printing medium on the basis of the image data generated by the host apparatus J0012. The printing apparatus J0013 performs a printing operation by use of 10 color inks of cyan (C), light cyan (Lc), magenta (M), light magenta (Lm), yellow (Y), red (R), green (G), black 1 (K1), black 2 (K2) and gray (Gray). To this end, a printing head H1001 for ejecting these 10 color inks is used for the printing apparatus J0013. These 10 color inks are pigmented inks respectively including ten color pigments as the color materials thereof.

Programs operated with an operating system of the host apparatus J0012 include an application and a printer driver. An application J0001 executes a process of generating image data with which the printing apparatus makes a print. Personal computers (PC) are capable of receiving these image data or pre-edited data which is yet to process by use of various media. By means of a CF card, the host apparatus according to this embodiment is capable of populating, for example, JPEG-formatted image data associated with a photo taken with a digital camera. In addition, the host apparatus according to this embodiment is capable of populating, for example, TIFF-formatted image data read with a scanner and image data stored in a CD-ROM. Moreover, the host apparatus according to this embodiment is capable of capturing data from the Web through the Internet. These captured data are displayed on a monitor of the host apparatus. Thus, an edit, a process or the like is applied to these captured data by means of the application J0001. Thereby, image data R, G and B are generated, for example, in accordance with the sRGB specification. A user sets up a type of printing medium to be used for making a print, a printing quality and the like through a UI screen displayed on the monitor of the host apparatus. The user also issues a print instruction through the UI screen. Depending on this print instruction, the image data R, G and B are transferred to the printer driver.

The printer driver includes a precedent process J0002, a subsequent process J0003, a γ correction process J0004, a half-toning process J0005 and a print data creation process J0006 as processes performed by itself. Brief descriptions will be provided below for these processes J0002 to J0006.

(A) Precedent Process

The precedent process J0002 performs mapping of a gamut. In this embodiment, data are converted for the purpose of mapping the gamut reproduced by image data R, G and B in accordance with the sRGB specification onto a gamut to be produced by the printing apparatus. Specifically, a respective one of image data R, G and B deal with 256 gradations of the respective one of colors which are represented by 8 bits. These image data R, G and B are respectively converted to 8-bit data R, G and B in the gamut of the printing apparatus J0013 by use of a three-dimensional LUT.

(B) Subsequent Process

On the basis of the 8-bit data R, G and B obtained by mapping the gamut, the subsequent process J0003 obtains 8-bit color separation data on each of the 10 colors. The 8-bit color separation data correspond to a combination of inks which are used for reproducing a color represented by the 8-bit data R, G and B. Thus, the processing in which the amounts of the various inks are determined as a result of reproducing the color defined by the RGB color signal is called "color separation processing (color conversion processing)". Furthermore, this processing as with the Precedent process can be done concomitantly with three dimensional LUT.

Figure 25B:
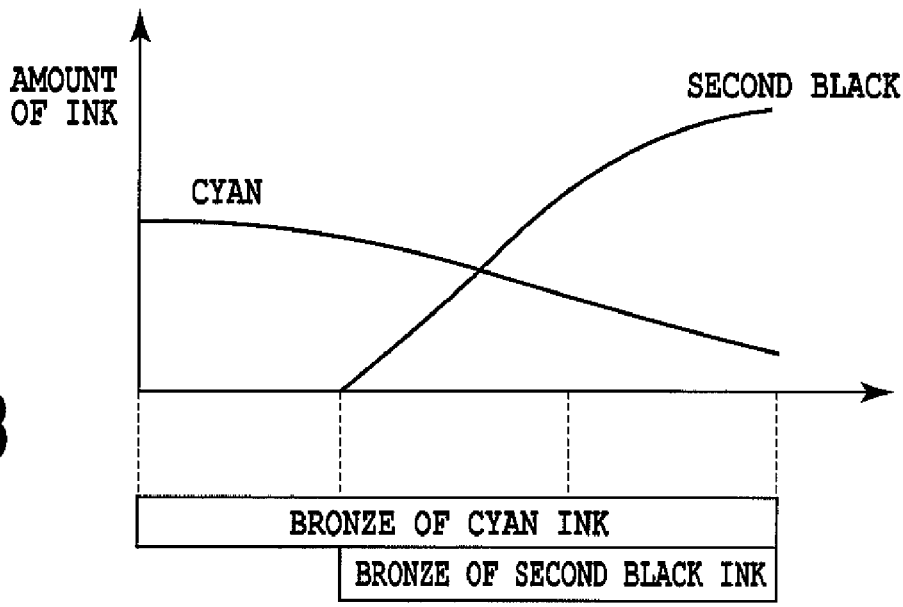

What is characteristic in this invention is the carrying out of color separation processing so as to reduce the bronze unevenness. Specific examples of color separation processing are shown in FIGS. 25b, 26B and 27B. In these examples, color separation data is generated relating to the various amounts of ink for reducing the bronze unevenness.

(C) γ Correction Process

The γ correction J0004 converts the color separation data on each of the 10 colors which have been obtained by the subsequent process J0003 to a tone value (gradation value) representing the color. Specifically, a one-dimensional LUT corresponding to the gradation characteristic of each of the color inks in the printing apparatus J0013 is used, and thereby a conversion is carried so that the color separation data on the 10 colors can be linearly associated with the gradation characteristics of the printer.

(D) Half-Toning Process

The half-toning process J0005 quantizes the 8-bit color separation data on each of Y, M, Lm, C, Lc, K1, K2, R, G and Gray to which the γ correction process has been applied so as to convert the 8-bit separation data to 4-bit data. In this embodiment, the 8-bit data dealing with the 256 gradations of each of the 10 colors are converted to 4-bit data dealing with 9 gradations by use of the error diffusion method. The 4-bit data are data which serve as indices each for indicating a dot arrangement pattern in a dot arrangement patterning process in the printing apparatus.

(E) Print Data Creation Process

The last process performed by the printer driver is the print data creation process J0006. This process adds information on print control to data on an image to be printed whose contents are the 4-bit index data, and thus creates print data.

Figure 2:
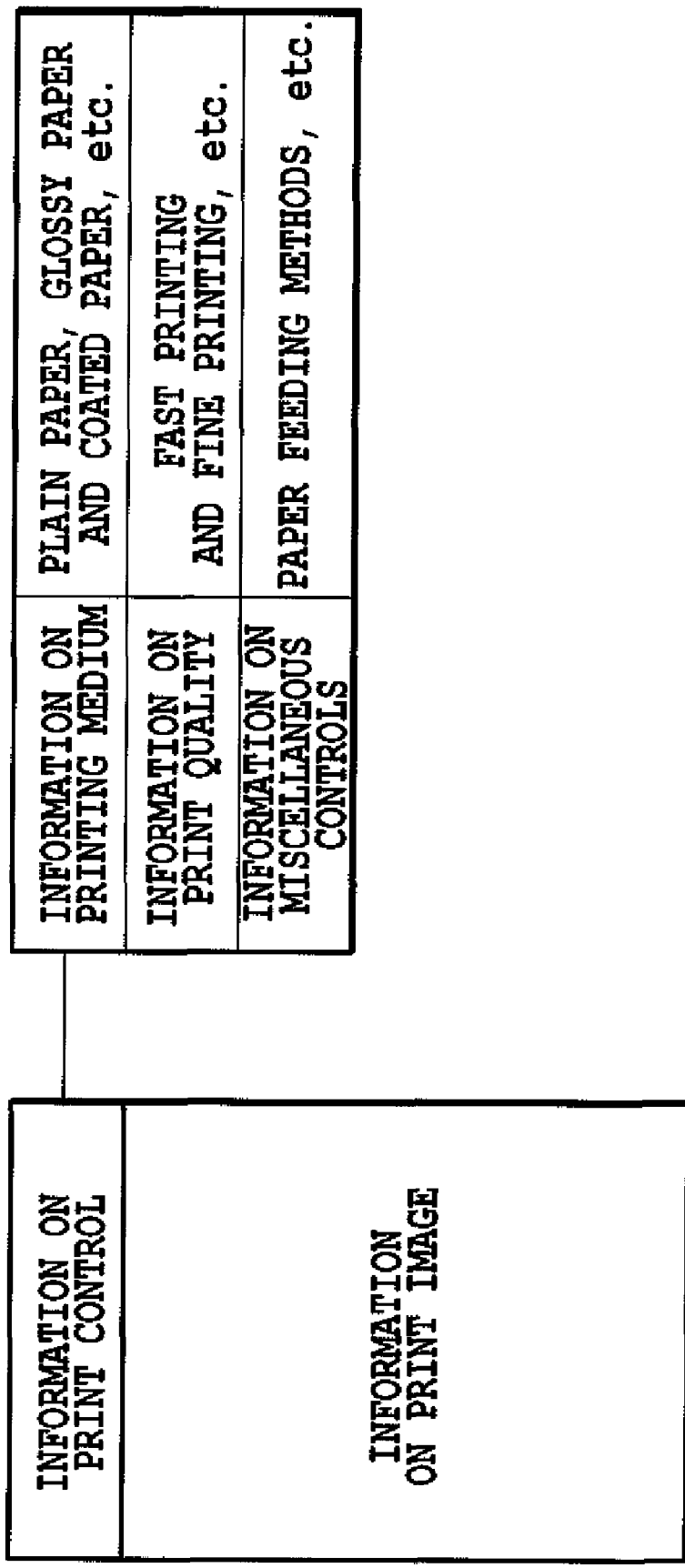
FIG. 2 is an explanatory diagram showing an example of a configuration of print data transferred from a printer driver of a host apparatus to a printing apparatus in the printing system shown in FIG. 1.

FIG. 2 is a diagram showing an example of a configuration of the print data. The print data are configured of the information on print control and the data on an image to be printed. The information on print control is in charge of controlling a printing operation. The data on an image to be printed indicates an image to be printed (the data are the foregoing 4-bit index data). The information on print control is configured of "information on printing media," "information on print qualities," and "information on miscellaneous controls" including information on paper feeding methods or the like. Types of printing media on which to make a print are described in the information on printing media. One type of printing medium selected out of a group of plain paper, glossy paper, a post card, a printable disc and the like is specified in the information on printing media. Print qualities to be sought are described in the information on print qualities. One type of print quality selected out of a group of "fine (high-quality print)," "normal," "fast (high-speed print)" and the like is specified in the information on print qualities. Note that these pieces of information on print control are formed on the basis of contents which a user designates through the UI screen in the monitor of the host apparatus J0012. In addition, image data originated in the half-toning process J0005 are described in the data on an image to be printed. The print data thus generated are supplied to the printing apparatus J0013.

The printing apparatus J0013 performs a dot arrangement patterning process J0007 and a mask data converting process J0008 on the print data which have been supplied from the host apparatus J0012. Descriptions will be provided next for the dot arrangement patterning process J0007 and the mask data converting process J0008.

(F) Dot Arrangement Patterning Process

In the above-described half-toning process J0005, the number of gradation levels is reduced from the 256 tone values dealt with by multi-valued tone information (8-bit data) to the 9 tone values dealt with by information (4-bit data). However, data with which the printing apparatus J0013 is actually capable of making a print are binary data (1-bit) data on whether or not an ink dot should be printed. Taken this into consideration, the dot arrangement patterning process J0007 assigns a dot arrangement pattern to each pixel represented by 4-bit data dealing with gradation levels 0 to 8 which are an outputted value from the half-toning process J0005. The dot arrangement pattern corresponds to the tone value (one of the levels 0 to 8) of the pixel. Thereby, whether or not an ink dot should be printed (whether a dot should be on or off) is defined for each of a plurality of areas in each pixel. Thus, 1-bit binary data indicating "1 (one)" or "0 (zero)" are assigned to each of the areas of the pixel. In this respect, "1 (one)" is binary data indicating that a dot should be printed. "0 (zero)" is binary data indicating that a dot should not be printed.

Figure 3:
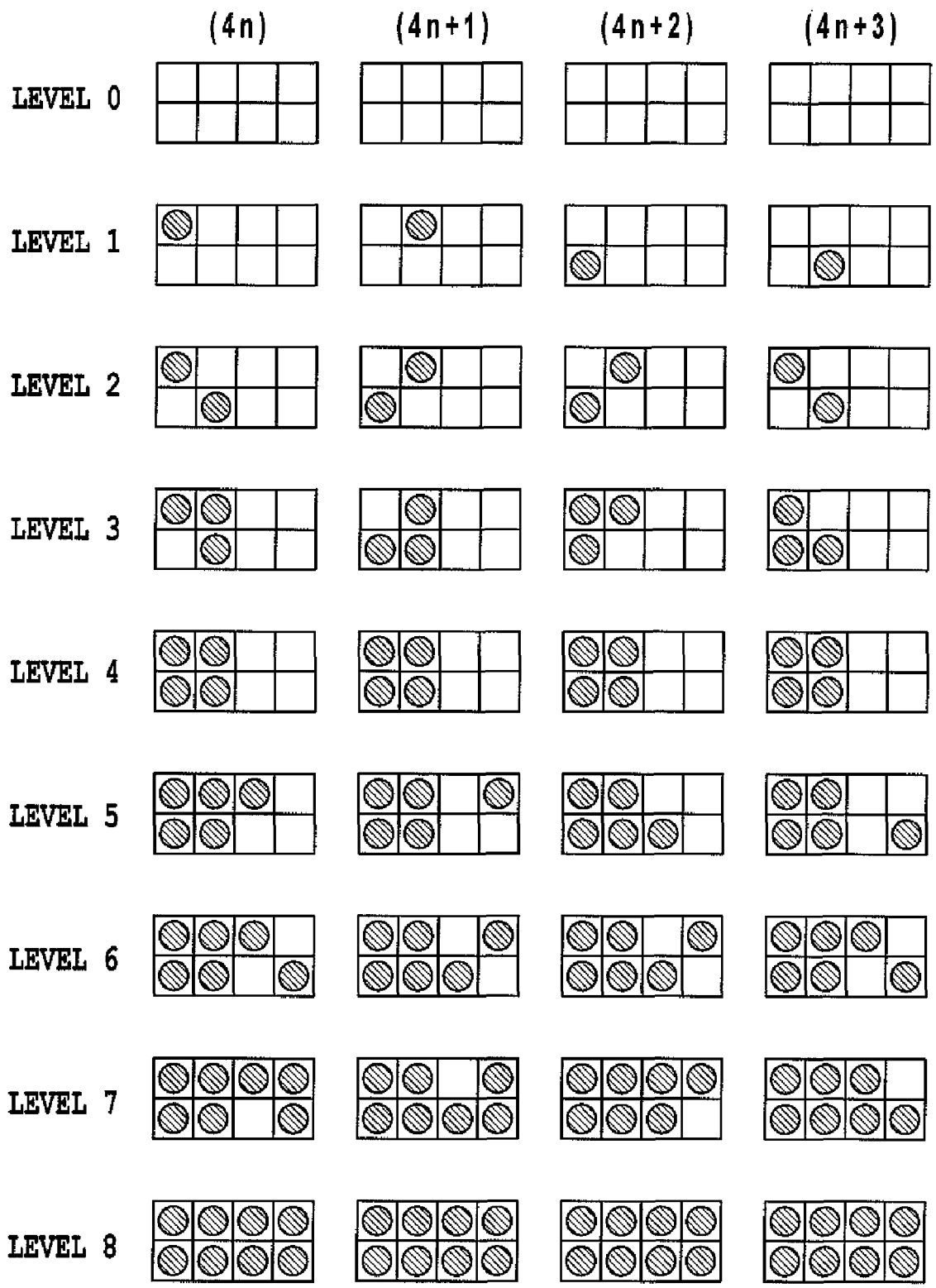
FIG. 3 is a diagram showing output patterns which correspond to input levels, and which are obtained by conversion in a dot arrangement patterning process in the printing apparatus used in the embodiment.

FIG. 3 shows output patterns corresponding to input levels 0 to 8. These output patterns are obtained through the conversion performed in the dot arrangement patterning process of the embodiment. Level numbers in the left column in the diagram correspond respectively to the levels 0 to 8 which are the outputted values from the half-toning process in the host apparatus. Regions each configured of 2 vertical areas×4 horizontal areas are shown to the right of this column. Each of the regions corresponds to a region occupied by one pixel receiving an output from the half-toning process. In addition, each of the areas in one pixel corresponds to a minimum unit for which it is specified whether the dot thereof should be on or off. Note that, in this description, a "pixel" means a minimum unit which is capable of representing a gradation, and also means a minimum unit to which the image processes (the precedent process, the subsequent process, the γ correction process, the half-toning process and the like) are applied using multi-valued data represented by the plurality of bits.

In this figure, an area in which a circle is drawn denotes an area where a dot is printed. As the level number increases, the number of dots to be printed increases one-by-one. In this embodiment, information on density of an original image is finally reflected in this manner.

From the left to the right, (4n) to (4n+3) denotes horizontal positions of pixels, each of which receives data on an image to be printed. An integer not smaller than 1 (one) is substituted for n in the expression (4n) to (4n+3). The patterns listed under the expression indicate that a plurality of mutually-different patterns are available depending on a position where a pixel is located even though the pixel receives an input at the same level. In other words, the configuration is that, even in a case where a pixel receives an input at one level, the four types of dot arrangement patterns under the expression (4n) to (4n+3) at the same level are assigned to the pixel in an alternating manner.

In FIG. 3, the vertical direction is a direction in which the ejection openings of the printing head are arrayed, and the horizontal direction is a direction in which the printing head moves. The configuration enabling a print to be made using the plurality of different dot arrangement patterns for one level brings about the following two effects. First, the number of times that ejection is performed can be equalized between two nozzles in which one nozzle is in charge of the patterns located in the upper row of the dot arrangement patterns at one level, and the other nozzle is in charge of the patterns located in the lower row of the dot arrangement patterns at the same level. Secondly, various noises unique to the printing apparatus can be disgregated.

When the above-described dot arrangement patterning process is completed, the assignment of dot arrangement patterns to the entire printing medium is completed.

(G) Mask Data Converting Process

In the foregoing dot arrangement patterning process J0007, whether or not a dot should be printed is determined for each of the areas on the printing medium. As a result, if binary data indicating the dot arrangement are inputted to a drive circuit J0009 of the printing head H1001, a desired image can be printed. In this case, what is termed as a one-pass print can be made. The one-pass print means that a print to be made for a single scan region on a printing medium is completed by the printing head H1001 moving once. Alternatively, what is termed as a multi-pass print can be made. The multi-pass print means that a print to be made for a single scan region on the printing medium is completed by the printing head moving a plurality of times. Here, descriptions will be provided for a mask data converting process, taking an example of the multi-pass print.

Figure 4:
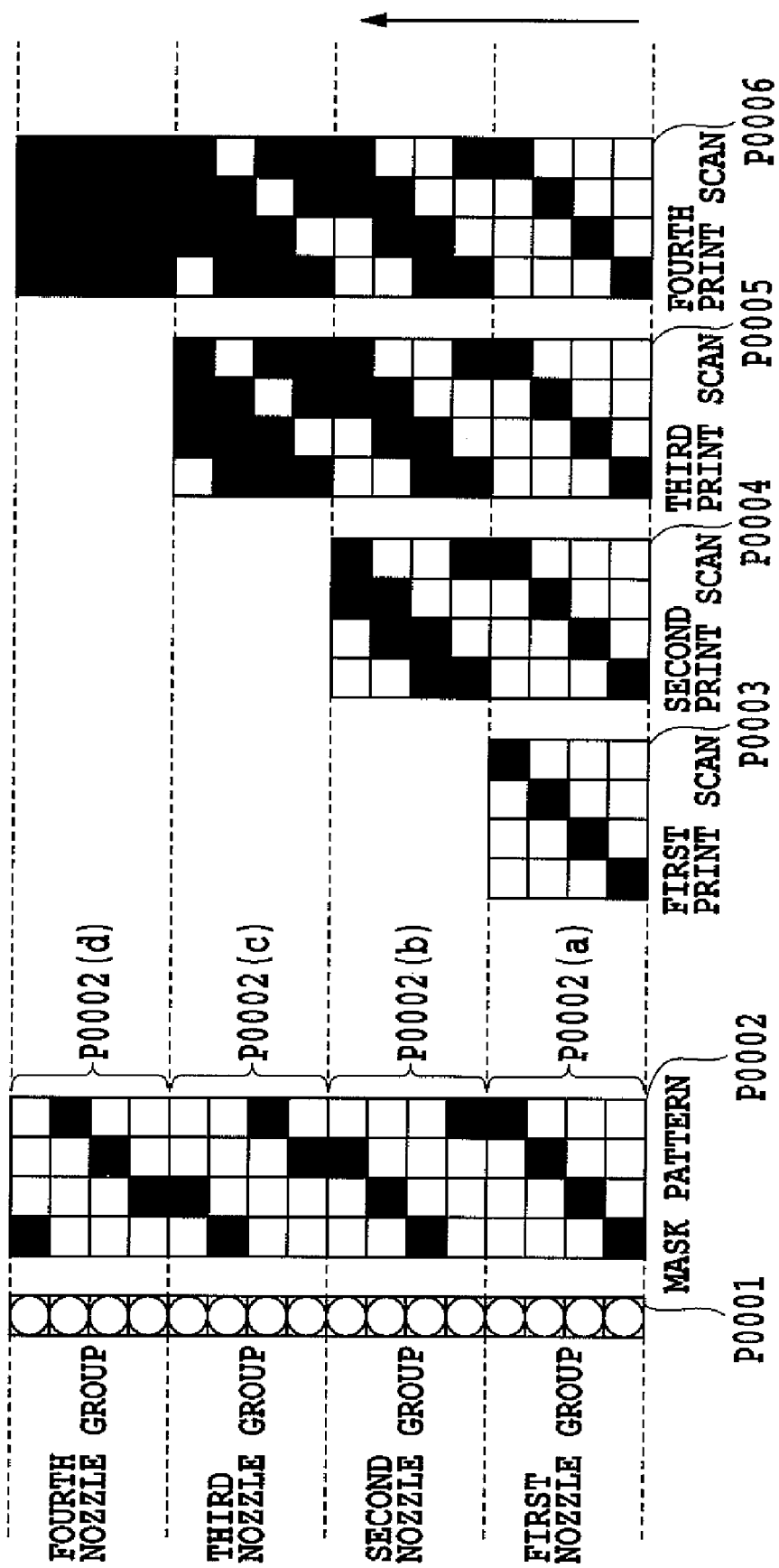
FIG. 4 is a schematic diagram for explaining a multi-pass printing method which is performed by the printing apparatus used in the embodiment.

FIG. 4 is a schematic diagram showing the printing head and print patterns for the purpose of describing the multi-pass printing method. The print head H1001 applied to this embodiment actually has 768 nozzles. For the sake of convenience, however, descriptions will be provided for the printing head and the print patterns, supposing that the printing head H1001 has 16 nozzles. The nozzles are divided into a first to a fourth nozzle groups. Each of the four nozzle groups includes four nozzles. Mask P0002 are configured of a first to a fourth mask patterns P0002(a) to P0002(d). The first to the fourth mask patterns P0002(a) to P0002(d) define the respective areas in which the first to the fourth nozzle groups are capable of making a print. Blackened areas in the mask patterns indicate printable areas, whereas whitened areas in the mask patterns indicate unprinted areas. The first to the fourth mask patterns are complementary to one another. The configuration is that, when these four mask patterns are superposed over one another, a print to be made in a region corresponding to a 4×4 area is completed.

Patterns denoted by reference numerals P0003 to P0006 show how an image is going to be completed by repeating a print scan. Each time a print scan is completed, the printing medium is transferred by a width of the nozzle group (a width of four nozzles in this figure) in a direction indicated by an arrow in the figure. In other words, the configuration is that an image in any same region (a region corresponding to the width of each nozzle region) on the printing medium is completed by repeating the print scan four times. Formation of an image in any same region on the printing medium by use of multiple nozzle groups by repeating the scan the plurality of times in the afore-mentioned manner makes it possible to bring about an effect of reducing variations characteristic of the nozzles, and an effect of reducing variations in accuracy in transferring the printing medium.

Figure 5:
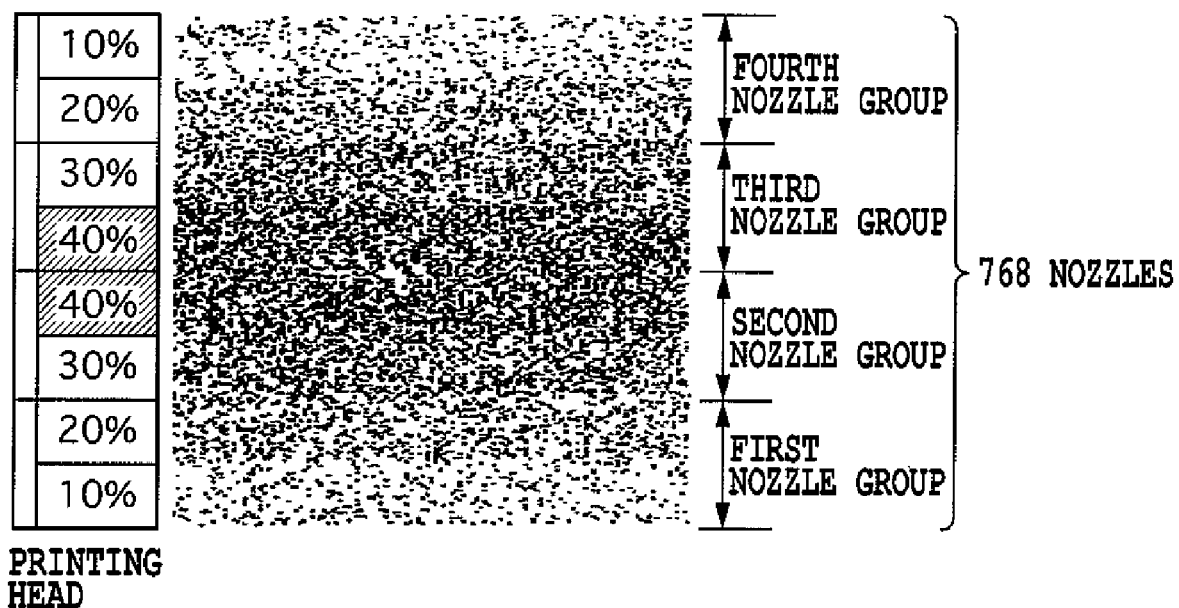
FIG. 5 is an explanatory diagram showing an example of mask patterns which are applied to the multi-pass printing method which is performed by the printing apparatus used in the embodiment.

FIG. 5 shows an example of mask which is capable of being actually applied to this embodiment. The printing head H1001 to which this embodiment is applied has 768 nozzles, and 192 nozzles belong to each of the four nozzle groups. As for the size of the mask, the mask has 768 areas in the vertical direction, and this number is equal to the number of nozzles. The mask has 256 areas in the horizontal direction. The mask has a configuration that the four mask patterns respectively corresponding to the four nozzle groups maintain a complementary relationship among themselves.

In the case of the ink jet printing head applied to this embodiment, which ejects a large number of fine ink droplets by means of a high frequency, it has been known that an air flow occurs in a neighborhood of the printing part during printing operation. In addition, it has been proven that this air flow particularly affects a direction in which ink droplets are ejected from nozzles located in the end portions of the printing head. For this reason, in the case of the mask patterns of this embodiment, a distribution of printable ratios is biased depending on which nozzle group a region belongs to, and on where a region is located in each of the nozzle groups, as seen from FIG. 5. As shown in FIG. 5, by employing the mask patterns having a configuration which makes the printable ratios of the nozzles in the end portions of the printing head smaller than those of nozzles in a central portion thereof, it is possible to make inconspicuous an adverse effect stemming from variations in positions where ink droplets ejected from the nozzles in the end portions of the printing head are landed.

Note that a printable ratio specified by a mask pattern is as follows. A printable ratio of a mask pattern is a percentage denomination of a ratio of the number of printable areas constituting the mask pattern (blackened areas in the mask pattern P0002(a) to P0002(d) of FIG. 4) to the sum of the number of printable areas and the number of unprintable areas constituting the mask pattern (the whitened areas in the mask patterns P0002(a) to P0002(d) of FIG. 4). In other words, a printable ratio (%) of a mask pattern is expressed by $$M \div (M+N) \times 100$$

where M denotes the number of printable areas constituting the mask pattern and N denotes the number of unprintable areas constituting the mask pattern.

In this embodiment, data for the mask as shown in FIG. 5 are stored in memory in the main body of the printing apparatus. The mask data converting process J0008 performs the AND process on the mask data with the binary data obtained in the foregoing dot arrangement patterning process. Thereby, binary data to be a print object in each print scan are determined. Subsequently, the binary data are transferred to the driving circuit J0009. Thus, the printing head H1001 is driven, and hence inks are ejected in accordance with the binary data.

FIG. 1 shows that the host apparatus J0012 is configured to perform the precedent process J0002, the subsequent process J0003, the γ correction process J0004, the half-toning process J0005 and the print data creation process J0006. In addition, FIG. 1 shows that the printing apparatus J0013 is designed to perform the dot arrangement patterning process J0007 and the mask data converting process J0008. However, the present invention is not limited to this embodiment. For example, the present invention may be carried out as an embodiment in which parts of the processes J0002 to J0005 are designed to be performed by the printing apparatus J0013 instead of by the host apparatus J0012. Otherwise, the present invention may be carried out as an embodiment in which all of these processes are designed to be performed by the host apparatus J0012. Alternately, the present invention may be carried out as an embodiment in which the processes J0002 to J0008 are designed to be performed by the printing apparatus J0013.

1.2 Configuration of Mechanisms

Descriptions will be provided for a configuration of the mechanisms in the printing apparatus to which this embodiment is applied. The main body of the printing apparatus of this embodiment is divided into a paper feeding section, a paper conveying section, a paper discharging section, a carriage section, a flat-pass printing section and a cleaning section from a viewpoint of functions performed by the mechanisms. These mechanisms are contained in an outer case.

Figure 6:
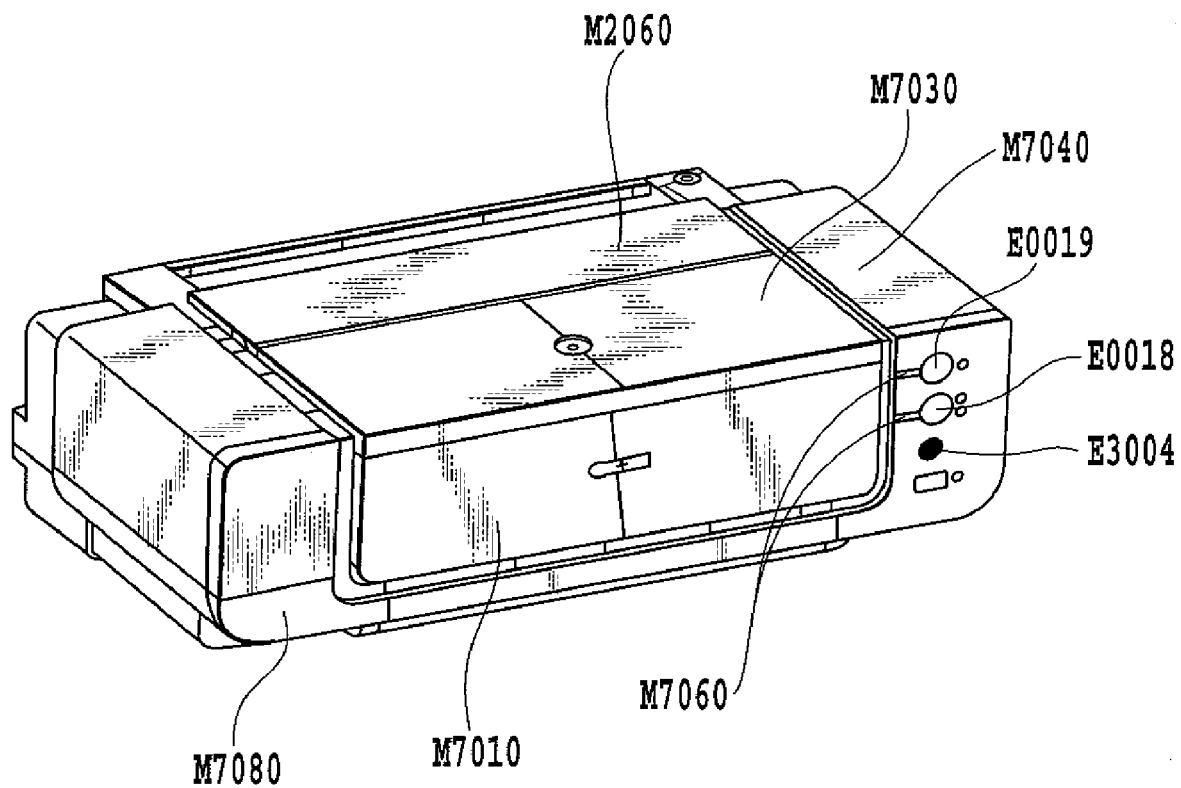
FIG. 6 is a perspective view of the printing apparatus used in the embodiment, and shows the printing apparatus in an unused condition when viewed from the front.
Figure 7:
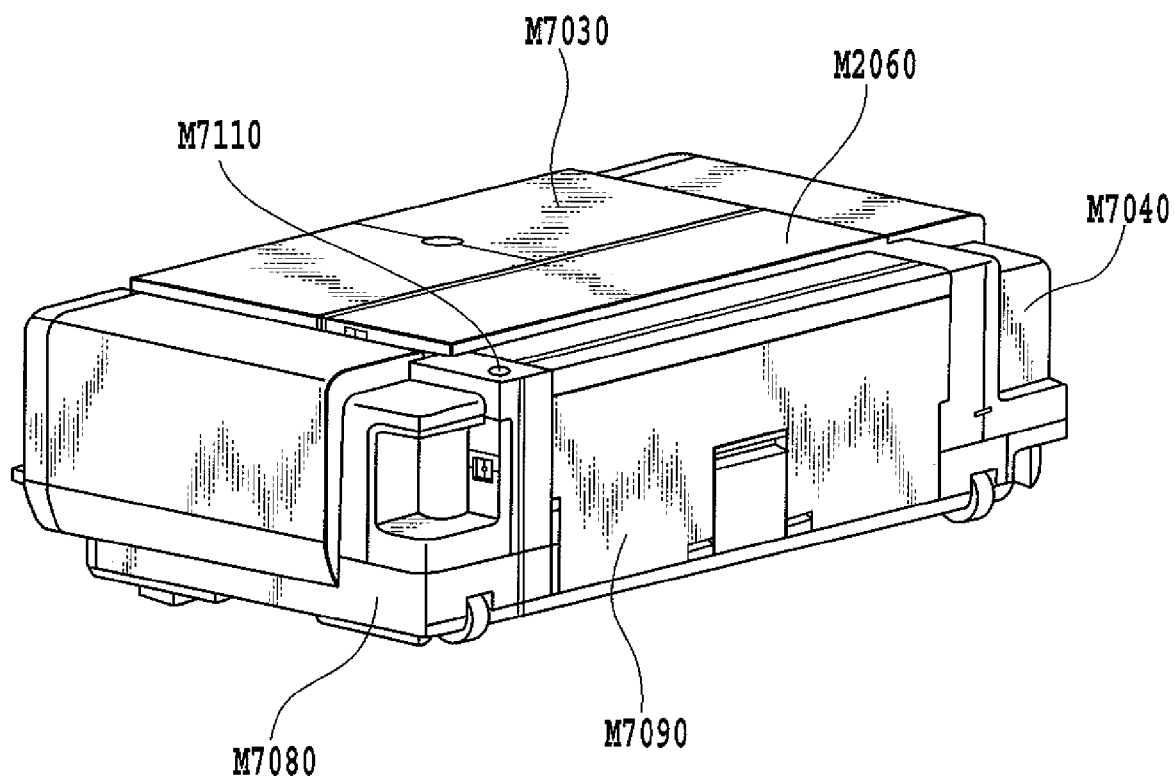
FIG. 7 is another perspective view of the printing apparatus used in the embodiment, and shows the printing apparatus in the unused condition when viewed from the back.
Figure 8:
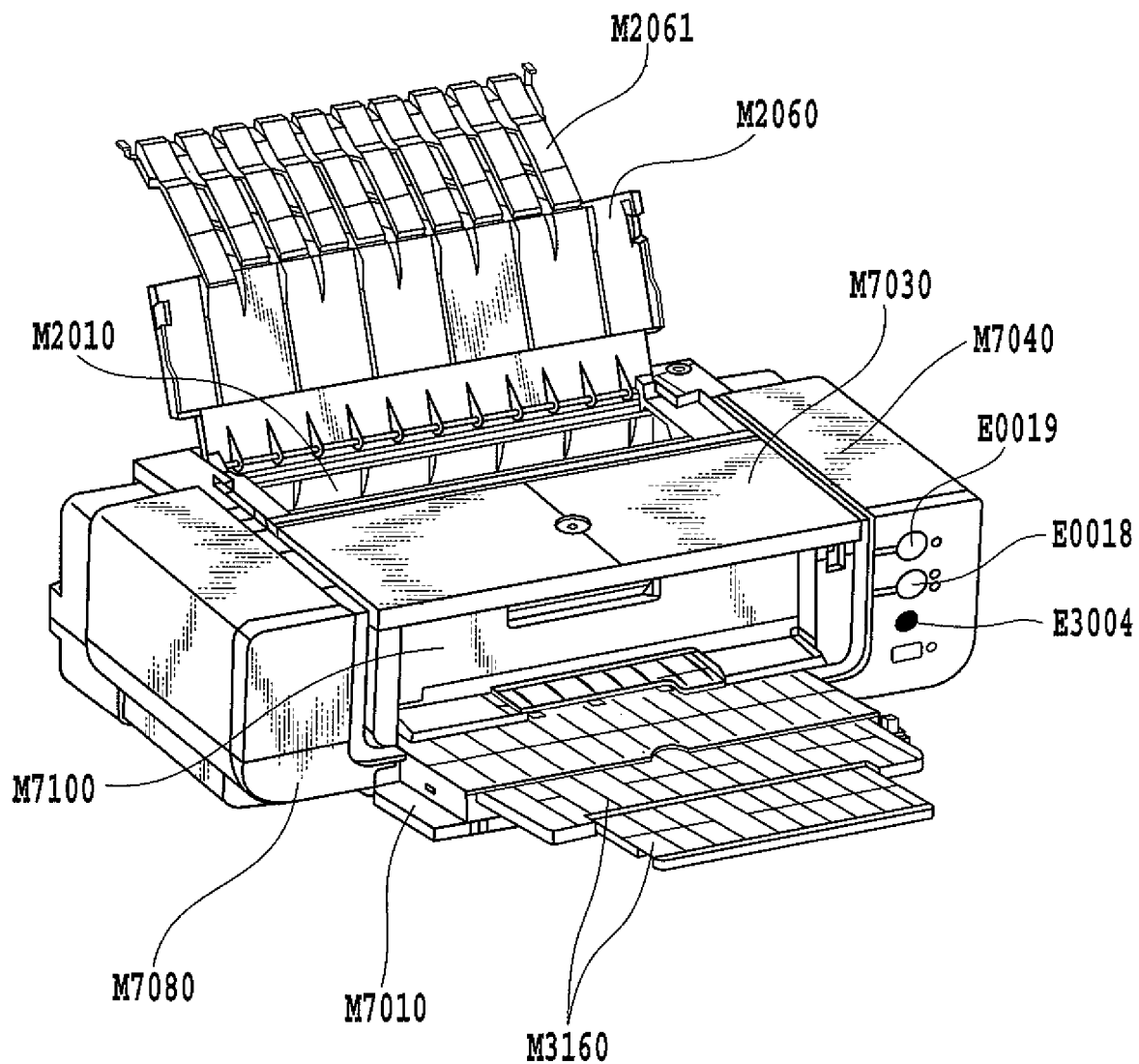
FIG. 8 is yet another perspective view of the printing apparatus used in the embodiment, and shows the printing apparatus in a used condition when viewed from the front.
Figure 9:
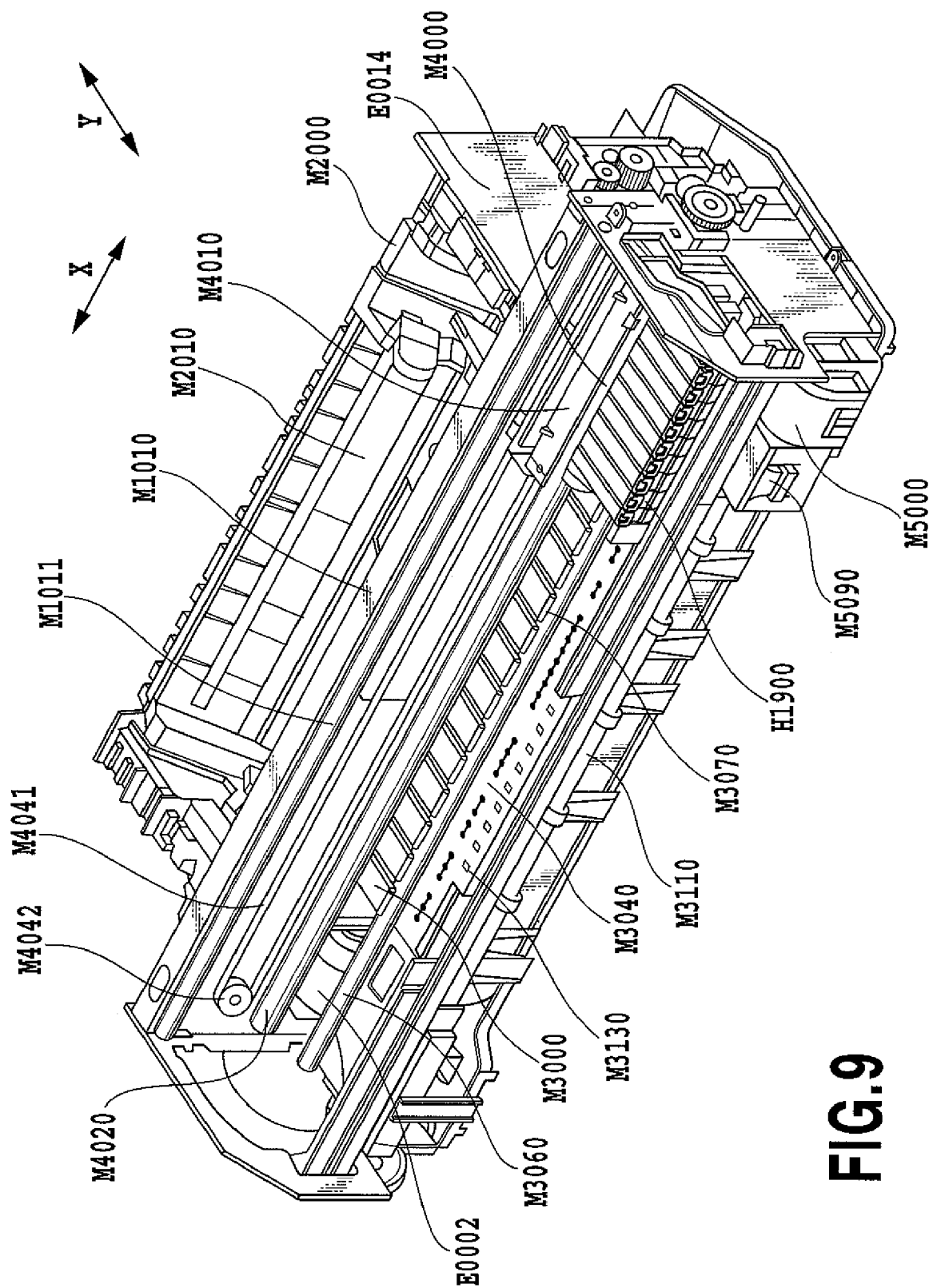
FIG. 9 is a diagram for explaining an internal mechanism of the main body of the printing apparatus used in the embodiment, and is a perspective view showing the printing apparatus when viewed from the right above.
Figure 10:
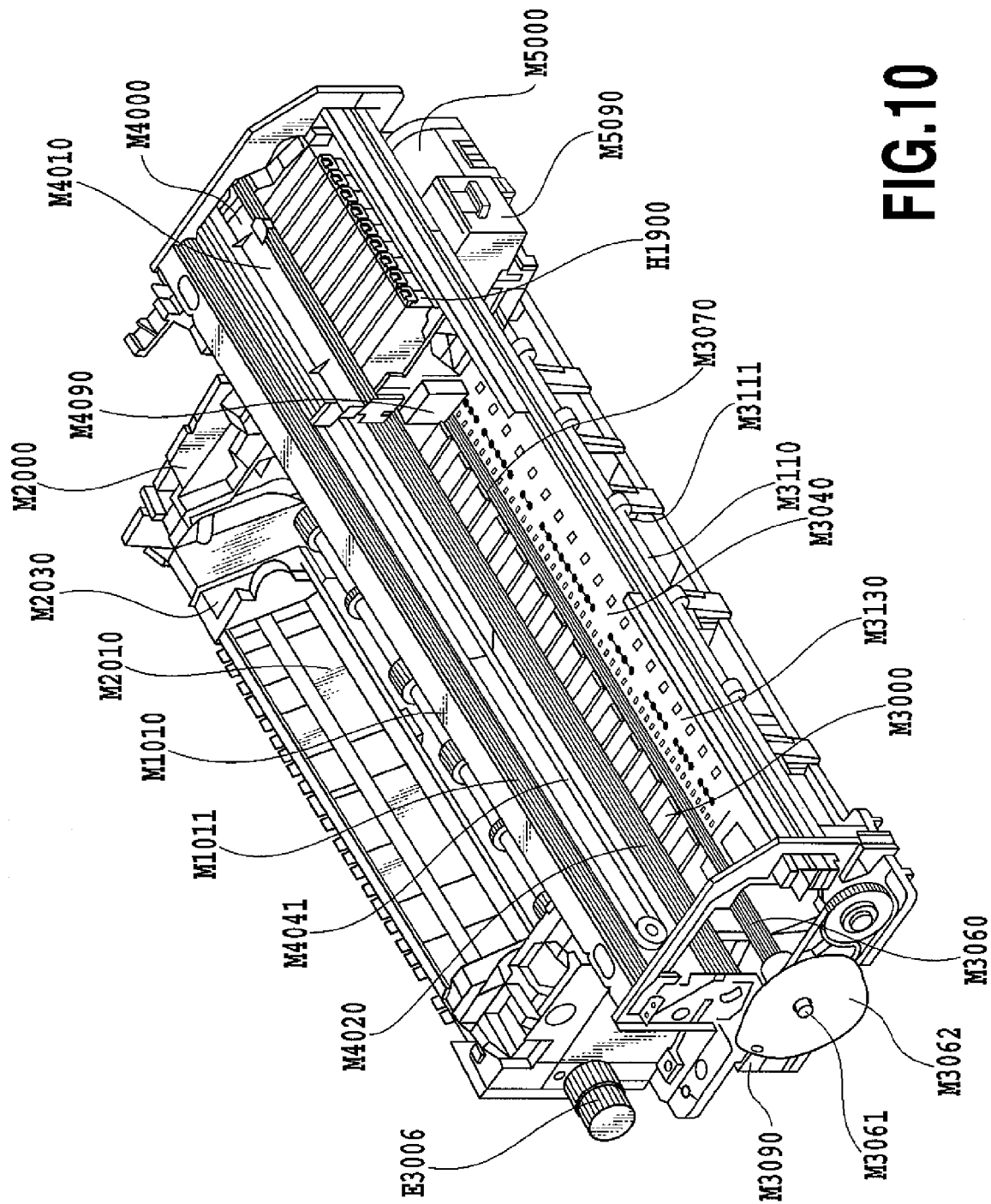
FIG. 10 is another diagram for explaining the internal mechanism of the main body of the printing apparatus used in the embodiment, and is another perspective view showing the printing apparatus when viewed from the left above.
Figure 11:
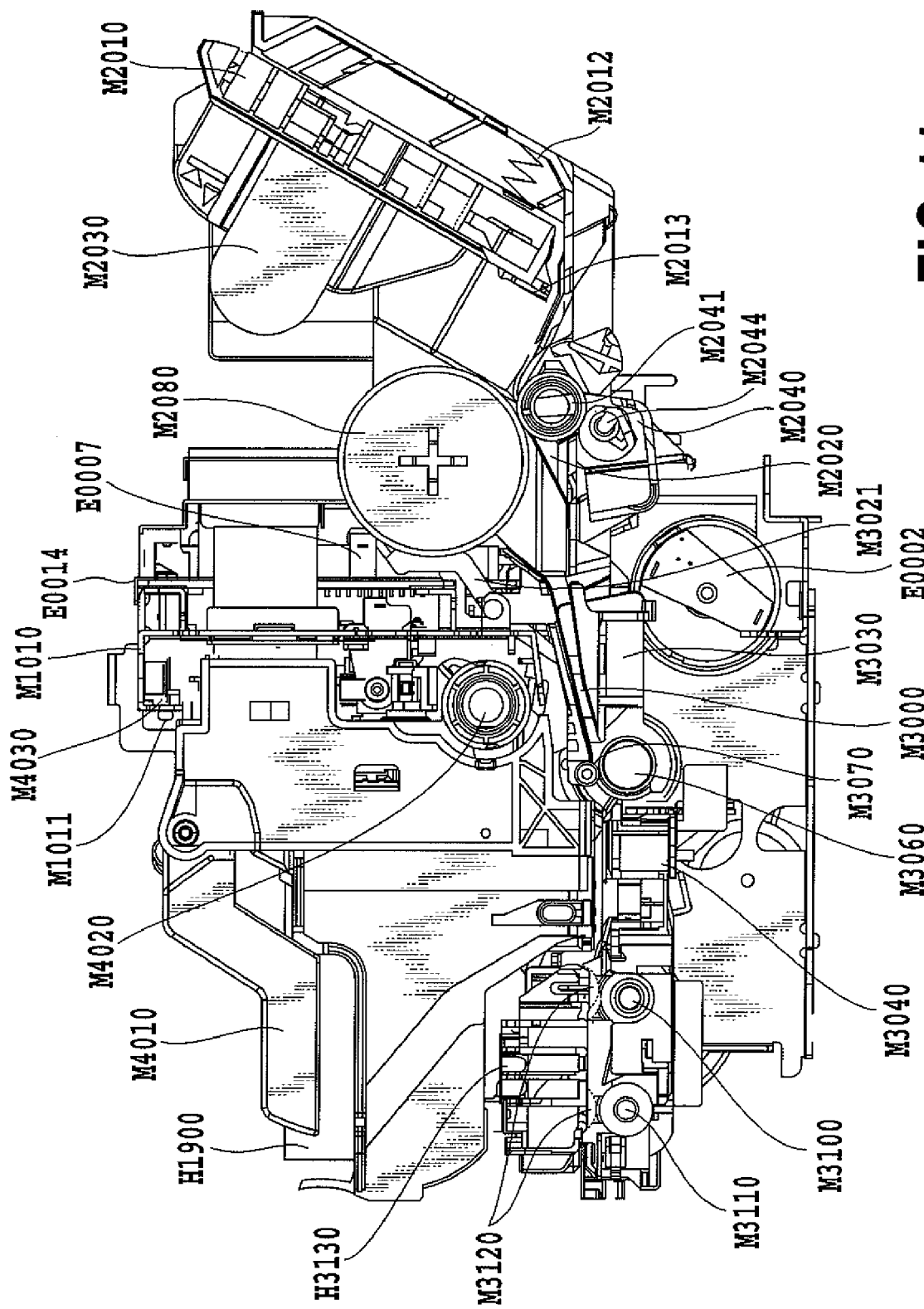
FIG. 11 is a side, cross-sectional view of the main body of the printing apparatus used in the embodiment for the purpose of explaining the internal mechanism of the main body of the printing apparatus.
Figure 12:
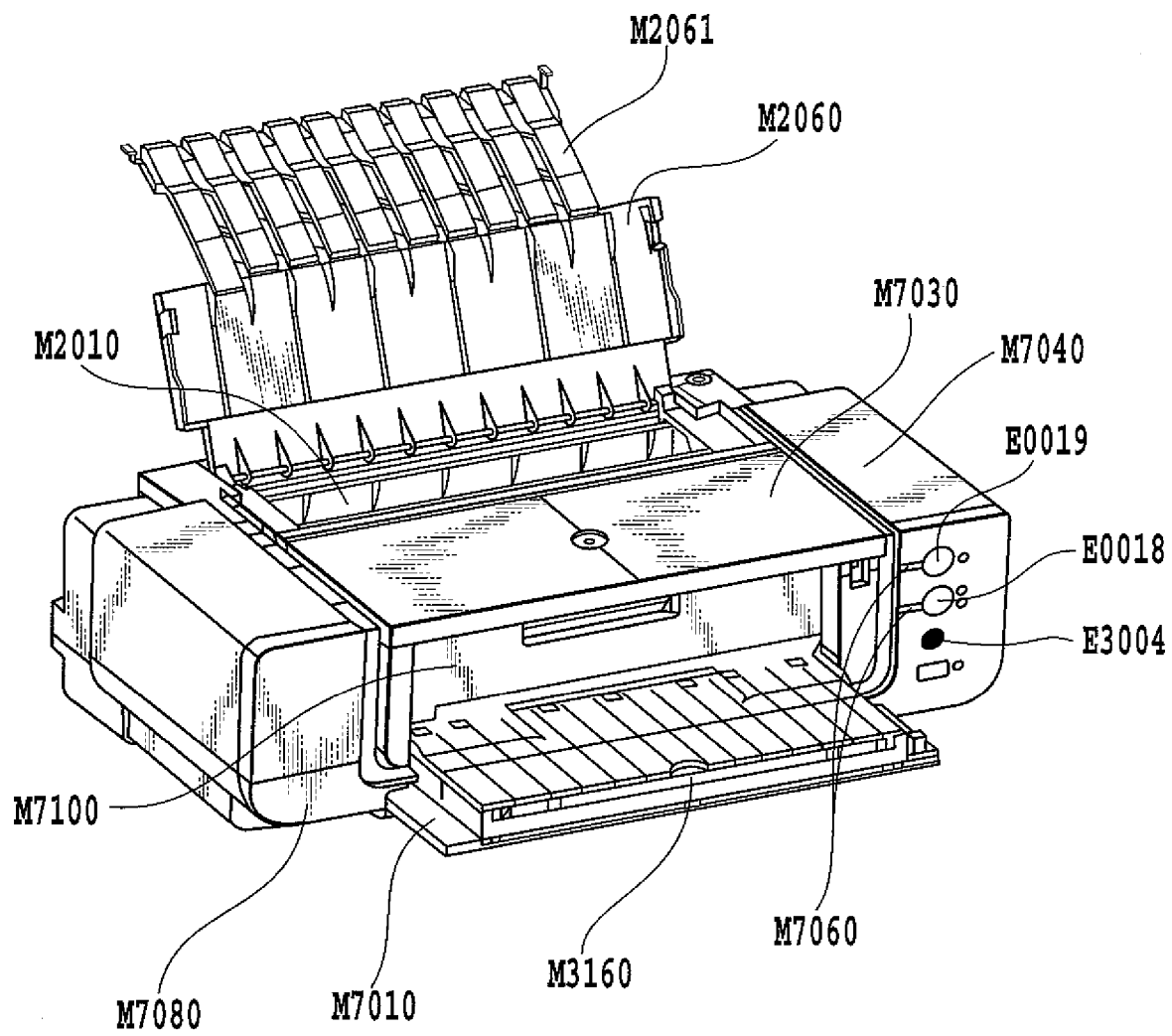
FIG. 12 is yet another perspective view of the printing apparatus used in the embodiment, and shows the printing apparatus in the process of performing a flat-pass printing operation when viewed from the front.
Figure 13:
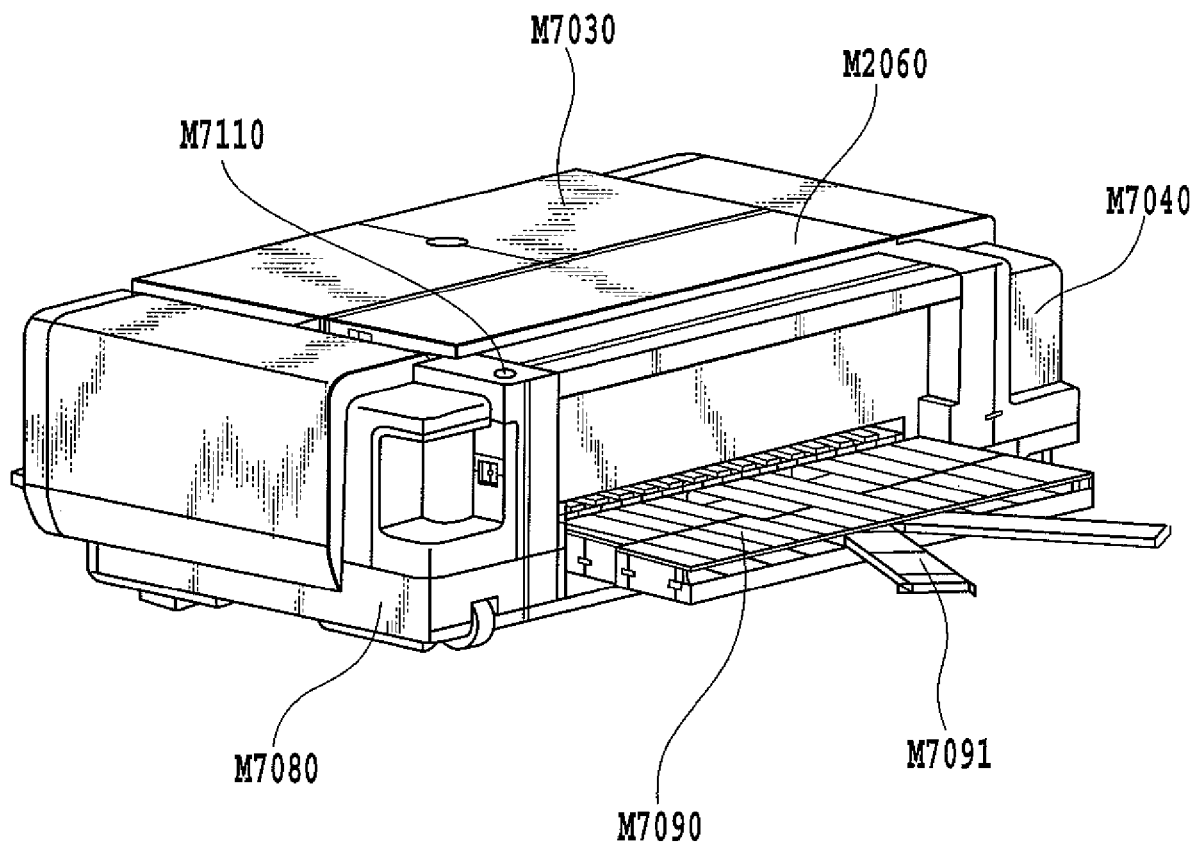
FIG. 13 is still another perspective view of the printing apparatus used in the embodiment, and shows the printing apparatus in the process of performing the flat-pass printing operation when viewed from the back.
Figure 14:
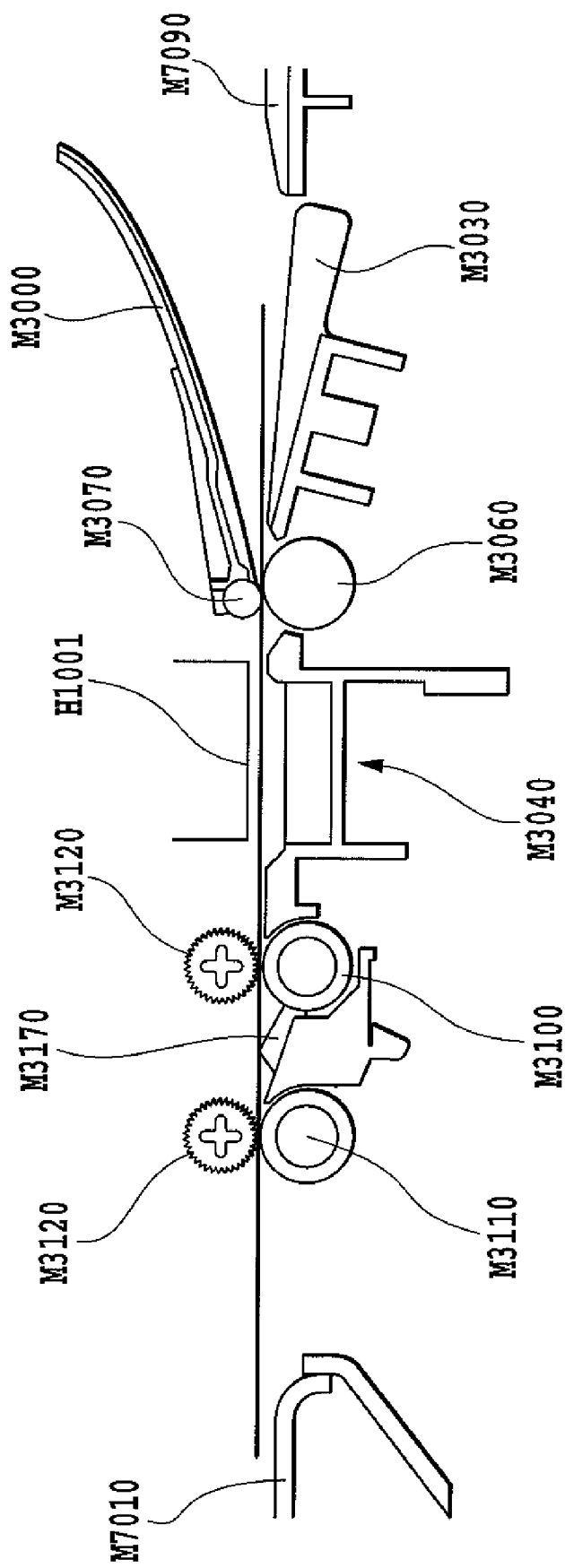
FIG. 14 is a schematic, side, cross-sectional view of the internal mechanism for explaining the flat-pass printing operation performed in the embodiment.
Figure 15:
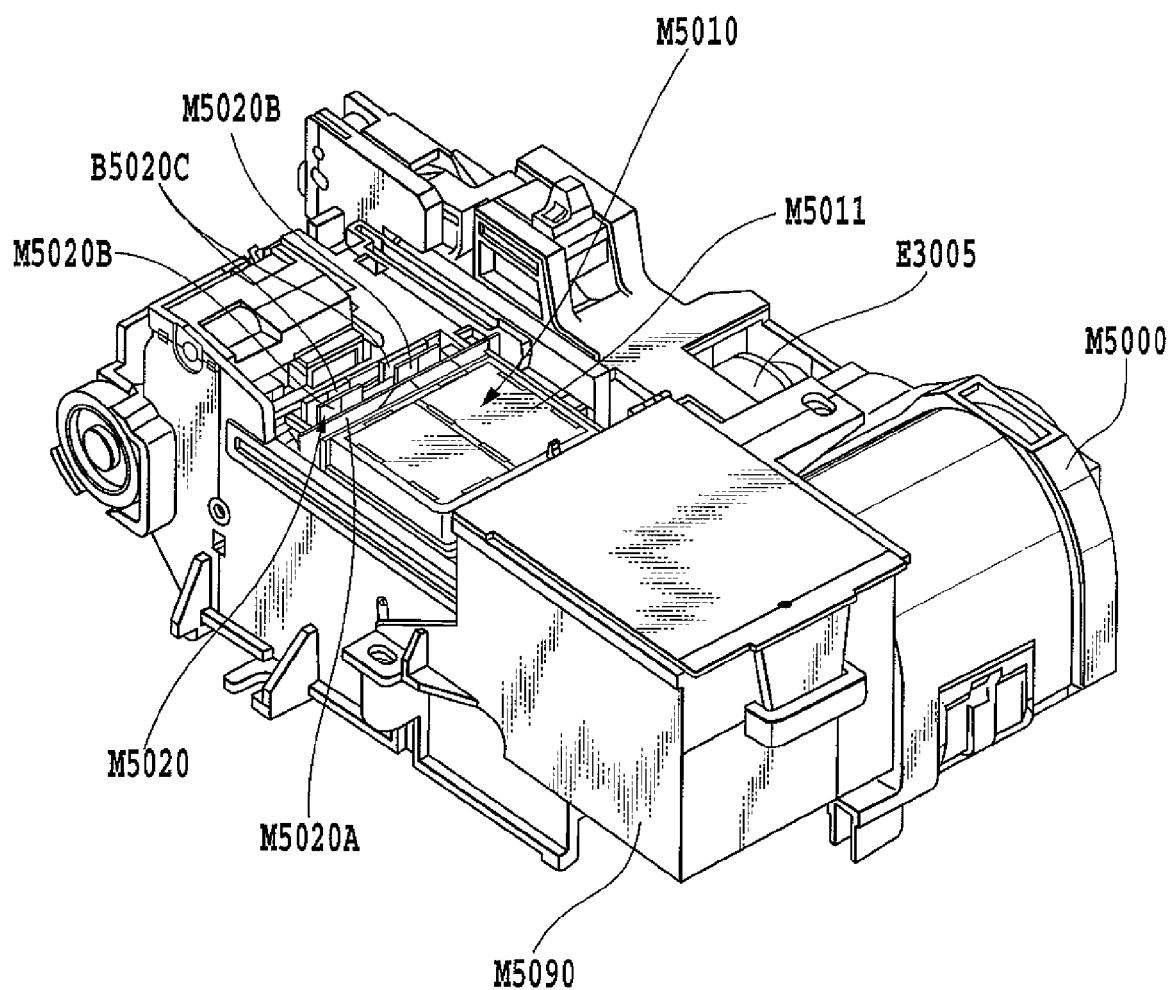
FIG. 15 is a perspective view showing a cleaning section in the main body of the printing apparatus used in the embodiment.
Figure 16:
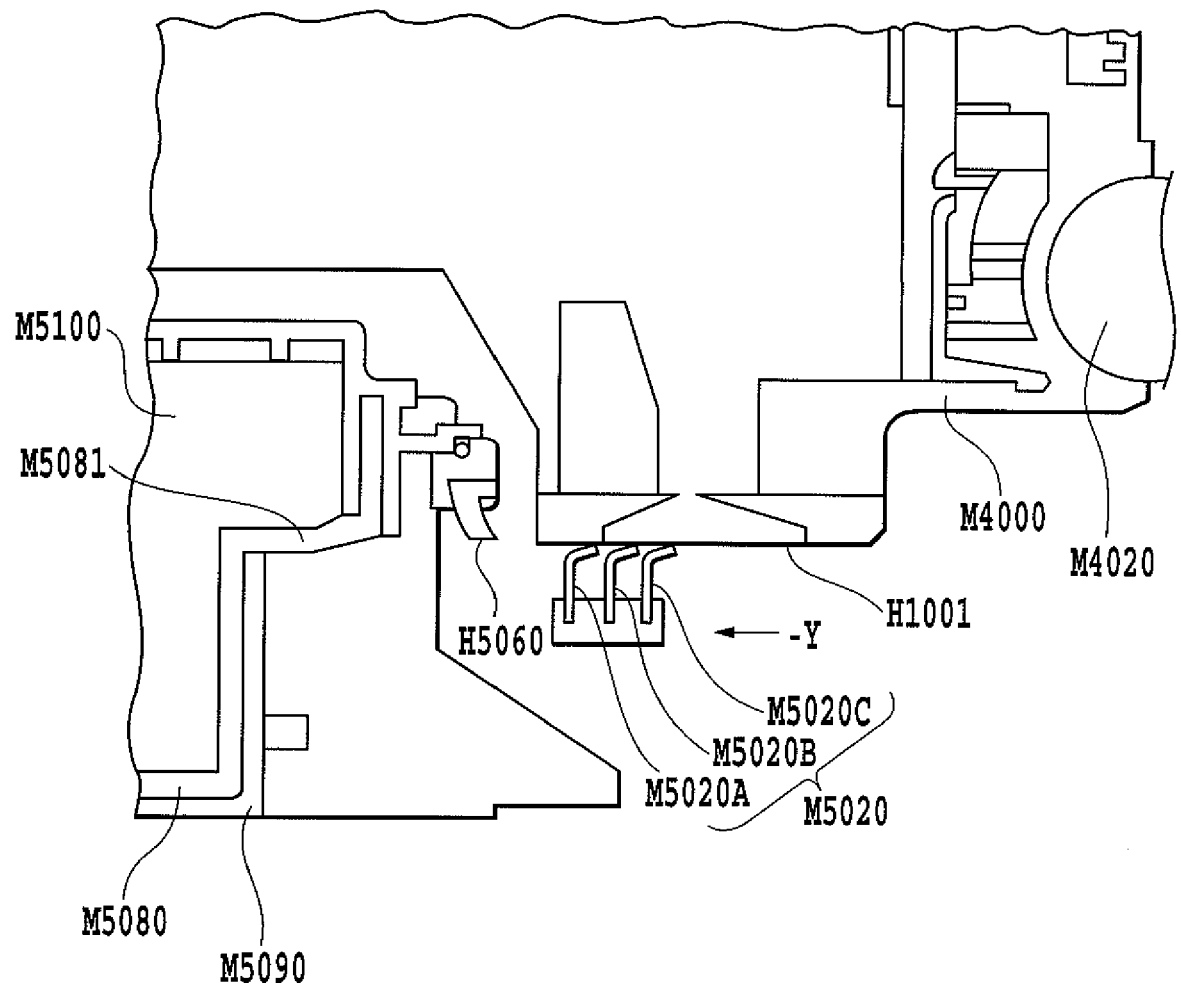
FIG. 16 is a cross-sectional view of a wiper portion in the cleaning section shown in FIG. 15 for explaining a configuration and an operation of the wiper portion.
Figure 17:
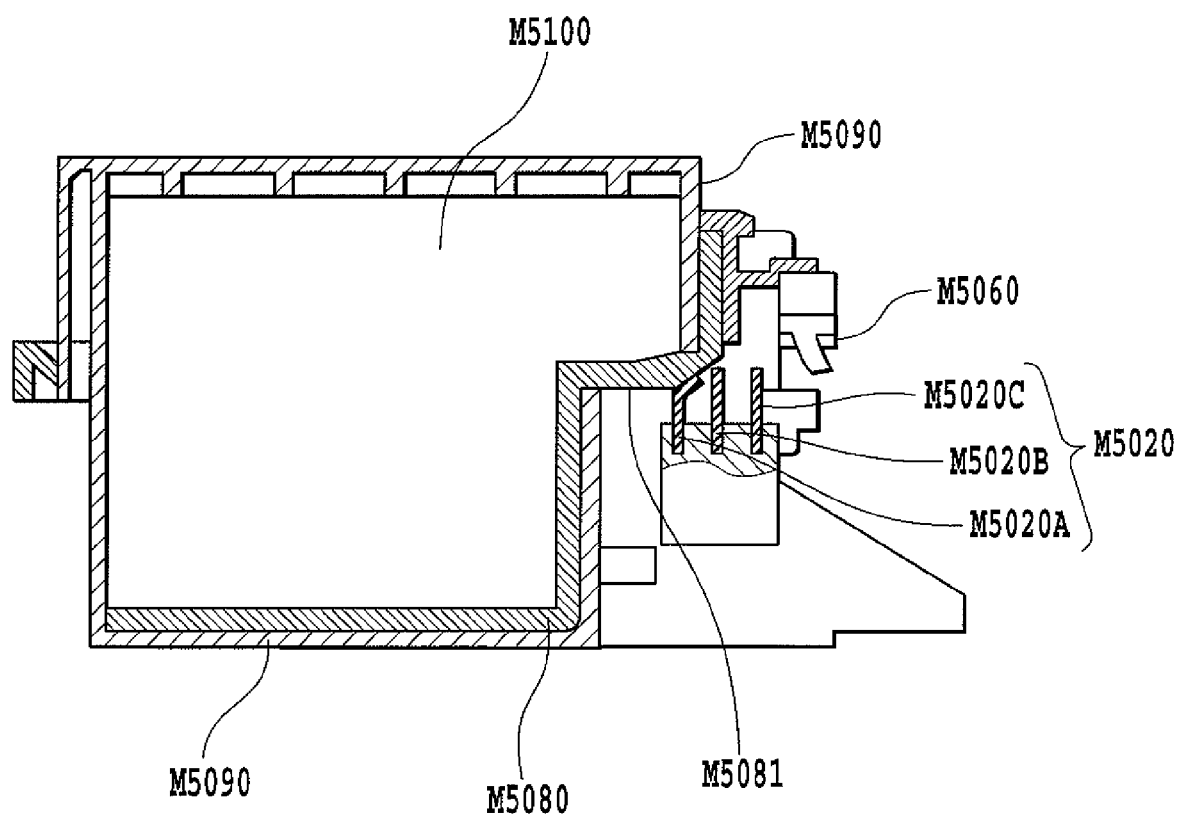
FIG. 17 is a cross-sectional view of a wetting liquid transferring unit in the cleaning section for explaining a configuration and an operation of the wetting liquid transferring unit.

FIGS. 6, 7, 8, 12 and 13 are perspective views respectively showing appearances of the printing apparatus to which this embodiment is applied. FIG. 6 shows the printing apparatus in an unused condition when viewed from the front. FIG. 7 shows the printing apparatus in an unused condition when viewed from the back. FIG. 8 shows the printing apparatus in a used condition when viewed from the front. FIG. 12 shows the printing apparatus during flat-pass printing when viewed from the front. FIG. 13 shows the printing apparatus during flat-pass printing when viewed from the back. In addition, FIGS. 9 to 11 and 14 to 16 are diagrams for describing internal mechanisms in the main body of the printing apparatus. In this respect, FIG. 9 is a perspective view showing the printing apparatus when viewed from the right above. FIG. 10 is a perspective view showing the printing apparatus when viewed from the left above. FIG. 11 is a side, cross-sectional view of the main body of the printing apparatus. FIG. 14 is a cross-sectional view of the printing apparatus during flat-pass printing. FIG. 15 is a perspective view of the cleaning section. FIG. 16 is a cross-sectional view for describing a configuration and an operation of a wiping mechanism in the cleaning section. FIG. 17 is a cross-sectional view of a wetting liquid transferring unit in the cleaning section.

Descriptions will be provided for each of the sections by referring to these figures whenever deemed necessary.

(A) Outer Case (Refer to FIGS. 6 and 7)

The outer case is attached to the main body of the printing apparatus in order to cover the paper feeding section, the paper conveying section, the paper discharging section, the carriage section, the cleaning section, the flat-pass section and the wetting liquid transferring unit. The outer case is configured chiefly of a lower case M7080, an upper case M7040, an access cover M7030, a connector cover, and a front cover M7010.

Paper discharging tray rails (not illustrated) are provided under the lower case M7080, and thus the lower case M7080 has a configuration in which a divided paper discharging tray M3160 is capable of being contained therein. In addition, the front cover M7010 is configured to close the paper discharging port while the printing apparatus is not used.

An access cover M7030 is attached to the upper case M7040, and is configured to be turnable. A part of the top surface of the upper case has an opening portion. The printing apparatus has a configuration in which each of ink tanks H1900 or the printing head H1001 (refer to FIG. 21) is replaced with a new one in this position. Incidentally, in the printing apparatus of this embodiment, the printing head H1001 has a configuration in which a plurality of ejecting portions are formed integrally into one unit. The plurality of ejecting portions corresponding respectively to a plurality of mutually different colors, and each of the plurality of ejecting portions is capable of ejecting an ink of one color. In addition, the printing head is configured as a printing head cartridge H1000 which the ink tanks H1900 are capable of being attached to, and detached from, independently of one another depending on the respective colors. The upper case M7040 is provided with a door switch lever (not illustrated), LED guides M7060, a power supply key E0018, a resume key E0019, a flat-pass key E3004 and the like. The door switch lever detects whether the access cover M7030 is opened or closed. Each of the LED guides M7060 transmits, and displays, light from the respective LEDs. Furthermore, a multistage paper feeding tray M2060 is turnably attached to the upper case M7040. While the paper feeding section is not used, the paper feeding tray M2060 is contained within the upper case M7040. Thus, the upper case M7040 is configured to function as a cover for the paper feeding section.

The upper case M7040 and the lower case M7040 are attached to each other by elastic fitting claws. A part provided with a connector portion therebetween is covered with a connector cover (not illustrated).

(B) Paper Feeding Section (Refer to FIGS. 8 and 11)

As shown in FIGS. 8 and 11, the paper feeding section is configured as follows. A pressure plate M2010, a paper feeding roller M2080, a separation roller M2041, a return lever M2020 and the like are attached to a base M2000. The pressure plate M2010 is that on which printing media are stacked. The paper feeding roller M2080 feeds the printing media sheet by sheet. The separation roller M2041 separates a printing medium. The return lever M2020 is used for returning the printing medium to a stacking position.

(C) Paper Conveying Section (Refer to FIGS. 8 to 11)

A conveying roller M3060 for conveying a printing medium is rotatably attached to a chassis M1010 made of an upwardly bent plate. The conveying roller M3060 has a configuration in which the surface of a metal shaft is coated with ceramic fine particles. The conveying roller M3060 is attached to the chassis M1010 in a state in which metallic parts respectively of the two ends of the shaft are received by bearings (not illustrated). The conveying roller M3060 is provided with a roller tension spring (not illustrated). The roller tension spring pushes the conveying roller M3060, and thereby applies an appropriate amount of load to the conveying roller M3060 while the conveying roller M3060 is rotating. Accordingly, the conveying roller M3060 is capable of conveying printing medium stably.

The conveying roller M3060 is provided with a plurality of pinch rollers M3070 in a way that the plurality of pinch rollers M3070 abut on the conveying roller M3060. The plurality of pinch rollers M3070 are driven by the conveying roller M3060. The pinch rollers M3070 are held by a pinch roller holder M3000. The pinch rollers M3070 are pushed respectively by pinch roller springs (not illustrated), and thus are brought into contact with the conveying roller M3060 with the pressure. This generates a force for conveying printing medium. At this time, since the rotation shaft of the pinch roller holder M3000 is attached to the bearings of the chassis M1010, the rotation shaft rotates thereabout.

A paper guide flapper M3030 and a platen M3040 are disposed in an inlet to which a printing medium is conveyed. The paper guide flapper M3030 and the platen M3040 guide the printing medium. In addition, the pinch roller holder M3000 is provided with a PE sensor lever M3021. The PE sensor lever M3021 transmits a result of detecting the front end or the rear end of each of the printing medium to a paper end sensor (hereinafter referred to as a "PE sensor") E0007 fixed to the chassis M1010. The platen M3040 is attached to the chassis M1010, and is positioned thereto. The paper guide flapper M3030 is capable of rotating about a bearing unit (not illustrated), and is positioned to the chassis M1010 by abutting on the chassis M1010.

The printing head H1001 (refer to FIG. 21) is provided at a side downstream in a direction in which the conveying roller M3060 conveys the printing medium.

Descriptions will be provided for a process of conveying printing medium in the printing apparatus with the foregoing configuration. A printing medium sent to the paper conveying section is guided by the pinch roller holder M3000 and the paper guide flapper M3030, and thus is sent to a pair of rollers which are the conveying roller 3060 and the pinch roller M3070. At this time, the PE sensor lever M3021 detects an edge of the printing medium. Thereby, a position in which a print is made on the printing medium is obtained. The pair of rollers which are the conveying roller M3060 and the pinch roller M3070 are driven by an LF motor E0002, and are rotated. This rotation causes the printing medium to be conveyed over the platen M3040. A rib is formed in the platen M3040, and the rib serves as a conveyance datum surface. A gap between the printing head H1001 and the surface of the printing medium is controlled by this rib. Simultaneously, the rib also suppresses flapping of the printing medium in cooperation with the paper discharging section which will be described later.

A driving force with which the conveying roller M3060 rotates is obtained by transmitting a torque of the LF motor E0002 consisting, for example, of a DC motor to a pulley M3061 disposed on the shaft of the conveying roller M3060 through a timing belt (not illustrated). A code wheel M3062 for detecting an amount of conveyance performed by the conveying roller M3060 is provided on the shaft of the conveying roller M3060. In addition, an encode sensor M3090 for reading a marking formed in the code wheel M3062 is disposed in the chassis M1010 adjacent to the code wheel M3062. Incidentally, the marking formed in the code wheel M3062 is assumed to be formed at a pitch of 150 to 300 lpi (line/inch) (an example value).

(D) Paper Discharging Section (Refer to FIGS. 8 to 11)

The paper discharging section is configured of a first paper discharging roller M3100, a second paper discharging roller M3110, a plurality of spurs M3120 and a gear train.

The first paper discharging roller M3100 is configured of a plurality of rubber portions provided around the metal shaft thereof. The first paper discharging roller M3100 is driven by transmitting the driving force of the conveying roller M3060 to the first paper discharging roller M3100 through an idler gear.

The second paper discharging roller M3110 is configured of a plurality of elastic elements M3111, which are made of elastomer, attached to the resin-made shaft thereof. The second paper discharging roller M3110 is driven by transmitting the driving force of the first paper discharging roller M3100 to the second paper discharging roller M3110 through an idler gear.

Each of the spurs M3120 is formed by integrating a circular thin plate and a resin part into one unit. A plurality of convex portions are provided to the circumference of each of the spurs M3120. Each of the spurs M3120 is made, for example, of SUS. The plurality of spurs M3120 are attached to a spur holder M3130. This attachment is performed by use of a spur spring obtained by forming a coiled spring in the form of a stick. Simultaneously, a spring force of the spur spring causes the spurs M3120 to abut respectively on the paper discharging rollers M3100 and M3110 at predetermined pressures. This configuration enables the spurs 3120 to rotate to follow the two paper discharging rollers M3100 and M3110. Some of the spurs M3120 are provided at the same positions as corresponding ones of the rubber portions of the first paper discharging roller M3110 are disposed, or at the same positions as corresponding ones of the elastic elements M3111 are disposed. These spurs chiefly generates a force for conveying printing medium. In addition, others of the spurs M3120 are provided at positions where none of the rubber portions and the elastic elements M3111 is provided. These spurs M3120 chiefly suppresses lift of a printing medium while a print is being made on the printing medium.

Furthermore, the gear train transmits the driving force of the conveying roller M3060 to the paper discharging rollers M3100 and M3110.

With the foregoing configuration, a printing medium on which an image is formed is pinched with nips between the first paper discharging roller M3110 and the spurs M3120, and thus is conveyed. Accordingly, the printing medium is delivered to the paper discharging tray M3160. The paper discharging tray M3160 is divided into a plurality of parts, and has a configuration in which the paper discharging tray M3160 is capable of being contained under the lower case M7080 which will be described later. When used, the paper discharging tray M3160 is drawn out from under the lower case M7080. In addition, the paper discharging tray M3160 is designed to be elevated toward the front end thereof, and is also designed so that the two side ends thereof are held at a higher position. The design enhances the stackability of printing media, and prevents the printing surface of each of the printing media from being rubbed.

(E) Carriage Section (Refer to FIGS. 9 to 11)

The carriage section includes a carriage M4000 to which the printing head H1001 is attached. The carriage M4000 is supported with a guide shaft M4020 and a guide rail M1011. The guide shaft M4020 is attached to the chassis M1010, and guides and supports the carriage M4000 so as to cause the carriage M4000 to perform reciprocating scan in a direction perpendicular to a direction in which a printing medium is conveyed. The guide rail M1011 is formed in a way that the guide rail M1011 and the chassis M1010 are integrated into one unit. The guide rail M1011 holds the rear end of the carriage M4000, and thus maintains the space between the printing head H1001 and the printing medium. A slide sheet M4030 formed of a thin plate made of stainless steel or the like is stretched on a side of the guide rail M1011, on which side the carriage M4000 slides. This makes it possible to reduce sliding noises of the printing apparatus.

The carriage M4000 is driven by a carriage motor E0001 through a timing belt M4041. The carriage motor E0001 is attached to the chassis M1010. In addition, the timing belt M4041 is stretched and supported by an idle pulley M4042. Furthermore, the timing belt M4041 is connected to the carriage M4000 through a carriage damper made of rubber. Thus, image unevenness is reduced by damping the vibration of the carriage motor E0001 and the like.

An encoder scale E0005 for detecting the position of the carriage M4000 is provided in parallel with the timing belt M4041 (the encoder scale E0005 will be described later by referring to FIG. 18). Markings are formed on the encoder scale E0005 at pitches in a range of 150 lpi to 300 lpi. An encoder sensor E0004 for reading the markings is provided on a carriage board E0013 installed in the carriage M4000 (the encoder sensor E0004 and the carriage board E0013 will be described later by referring to FIG. 18). A head contact E0101 for electrically connecting the carriage board E0013 to the printing head H1001 is also provided to the carriage board E0013. Moreover, a flexible cable E0012 (not illustrated) is connected to the carriage M4000 (the flexible cable E0012 will be described later by referring to FIG. 18). The flexible cable E0012 is that through which a drive signal is transmitted from an electric substrate E0014 to the printing head H1001.

As for components for fixing the printing head H1001 to the carriage M4000, the following components are provided to the carriage M4000. An abutting part (not illustrated) and pressing means (not illustrated) are provided on the carriage M4000. The abutting part is with which the printing head H1001 positioned to the carriage M4000 while pushing the printing head H1001 against the carriage M4000. The pressing means is with which the printing head H1001 is fixed at a predetermined position. The pressing means is mounted on a headset lever M4010. The pressing means is configured to act on the printing head H1001 when the headset lever M4010 is turned about the rotation support thereof in a case where the printing head H1001 is intended to be set up.

Moreover, a position detection sensor M4090 including a reflection-type optical sensor is attached to the carriage M4000. The position detection sensor is used while a print is being made on a special medium such as a CD-R, or when a print result or the position of an edge of a sheet of paper is being detected. The position detection sensor M4090 is capable of detecting the current position of the carriage M4000 by causing a light emitting device to emit light and by thus receiving the emitted light after reflecting off the carriage M4000.

In a case where an image is formed on a printing medium in the printing apparatus, the set of the conveying roller M3060 and the pinch rollers M3070 transfers the printing medium, and thereby the printing medium is positioned in terms of a position in a column direction. In terms of a position in a row direction, by using the carriage motor E0001 to move the carriage M4000 in a direction perpendicular to the direction in which the printing medium is conveyed, the printing head H1001 is located at a target position where an image is formed. The printing head H1001 thus positioned ejects inks onto the printing medium in accordance with a signal transmitted from the electric substrate E0014. Descriptions will be provided later for details of the configuration of the printing head H1001 and a printing system. The printing apparatus of this embodiment alternately repeats a printing main scan and a sub-scan. During the printing main scan, the carriage M4000 scans in the row direction while the printing head H1001 is making a print. During the sub-scan, the printing medium is conveyed in the column direction by conveying roller M3060. Thereby, the printing apparatus is configured to form an image on the printing medium.

(F) Flat-Pass Printing Section (Refer to FIGS. 12 to 14)

A printing medium is fed from the paper feed section in a state where the printing medium is bent, because the passage through which the printing medium passes continues curving up to the pinch rollers as shown in FIG. 11. For this reason, if a thicker printing medium with a thickness of approximately 0.5 mm or more, for example, is attempted to be fed from the paper feeding section, a reaction force of the bent printing medium occurs, and thus resistance to the paper feeding increases. As a result, it is likely that the printing medium cannot be fed. Otherwise, even if the printing medium can be fed, the delivered printing medium remains bent, or is folded.

A flat-pass print is made on printing media, such as thicker printing media, which a user does not wish to fold, and on printing media, such as CD-Rs, which cannot be bent.

Types of flat-pass prints include a type of print made by manually supplying a printing medium from a slit-shaped opening portion (under a paper feeding unit) in the back of the main body of a printing apparatus, and by thus causing pinch rollers of the main body to nip the printing medium. However, the flat-pass print of this embodiment employs the following mode. A printing medium is fed from the paper discharging port located in the front side of the main body of the printing apparatus to a position where a print is going to be made, and the print is made on the printing medium by switching back the printing medium.

The front cover M7010 is usually located below the paper discharging section, because the front cover M7010 is also used as a tray in which several tens of printing media on which prints have been made are stacked (refer to FIG. 8). When a flat-pass print is going to be made, the front tray M7010 is elevated up to a position where the paper discharging port is located (refer to FIG. 12) for the purpose of supplying a printing medium from the paper discharging port horizontally in a direction reverse to the direction in which a printing medium is usually conveyed. Hooks and the like (not illustrated) are provided to the front cover M7010. Thus, the front cover M7010 is capable of being fixed to a position where the printing medium is supplied for the purpose of the flat-pass print. It can be detected by a sensor whether or not the front cover M7010 is located at the position where the printing medium is supplied for the purpose of the flat-pass print. Depending on this detection, it can be determined whether the printing apparatus is in a flat-pass printing mode.

In the case of the flat-pass printing mode, first of all, a flat-pass key E3004 is operated for the purpose of placing a printing medium on the front tray M7010 and inserting the printing medium from the paper discharging port. Thereby, a mechanism (not illustrated) lifts the spur holder M3130 and the pinch roller holder M3000 respectively up to positions higher than a presumed thickness of the printing medium. In addition, in a case where the carriage M4000 exists in an area through which the printing medium is going to pass, a lifting mechanism (not illustrated) lifts the carriage M4000 up. This makes it easy to insert the printing medium therein. Moreover, by pressing a rear tray button M7110, a rear tray M7090 can be opened. Furthermore, a rear sub-tray M7091 can be opened in the form of the letter V (refer to FIG. 13). The rear tray M7090 and the rear sub-tray M7091 are trays with which a long printing medium is supported in the back of the main body of the printing apparatus. This is because, if the long printing medium is inserted from the front of the main body of the printing apparatus, the long printing medium juts out of the back of the main body of the printing apparatus. If a thicker printing medium is not kept flat while a print is being made on the thicker printing medium, the thicker printing medium may be rubbed against the head ejection face, or the conveyance load may change. This is likely to adversely affect the print quality. For this reason, the disposition of these trays is effective. However, if a printing medium is not long enough to jut out of the back of the main body of the printing apparatus, the rear tray M7090 and the like need not be opened.

In the foregoing manner, a printing medium can be inserted from the paper discharging port to the inside of the main body of the printing apparatus. A printing medium is positioned on the front tray M7010 by aligning the rear edge (an edge at the side located closest to a user) and the right edge of the printing medium to a position in the front tray M7010 where a marker is formed.

At this time, if the flat-pass key E3004 is operated once again, the spur holder M3130 comes down, and thus the paper discharging rollers M3100, M3110 and the spurs M3120 jointly nip the printing medium. Thereafter, the paper discharging rollers M3100 and M3110 draw the printing medium into the main body of the printing apparatus by a predetermined amount thereof (in a direction reverse to the direction in which the printing medium is conveyed during normal printing). Because the edge at the side closest to the user (the rear edge) of a printing medium is aligned to the marker when the printing medium is set up at the beginning, it is likely that the front edge (the edge located farthest from a user) of the printing medium may not reach the conveying roller M3060, if the printing medium is shorter. With this taken into consideration, the predetermined amount is defined as a distance between the rear edge of a printing medium with the presumably shortest length and the conveying roller M3060. Once a printing medium is transferred by the predetermined amount, the rear edge of the printing medium reaches the conveying roller M3060. Thus, the pinch roller holder M3000 is lowered at the position, and the conveying roller M3060 and the pinch rollers M3070 are caused to nip the printing medium. Subsequently, the printing medium is further transferred so that the rear edge of the printing medium is nipped by the conveying roller M3060 and the pinch rollers M3070. Thereby, the supplying of the printing medium for the purpose of the flat-pass print is completed (at a position where the printing medium waits for a print to be made thereon).

A nip force with which the paper discharging roller M3100 and M3110 as well as the spurs M3120 nip a printing medium is set relatively weak lest the force should adversely affect image formation while the printing medium is being delivered during a normal print. For this reason, in the case where a flat-pass print is going to be made, it is likely that the position of the printing medium shifts before the print starts. In this embodiment, however, a printing medium is nipped by the conveying roller M3060 and the pinch rollers M3070 which have a relatively stronger nip force. This secures a position where a printing medium should be set. In addition, while a printing medium is being conveyed into the inside of the main body by the predetermined amount, a flat-pass paper detection sensor lever (hereinafter referred to as an "FPPE sensor lever") M3170 blocks or forms a light path of an FPPE sensor E9001 which is an infrared-ray sensor, and which is not illustrated here. Thereby, the position of the rear edge (the position of the front edge during the print) of the printing medium can be detected. Incidentally, the FPPE sensor lever may be rotatably provided between the platen M3040 and the spur holder M3130.

Once a printing medium is set at the position where the printing medium waits for a print to be made thereon, a print command is executed. Specifically, the conveying roller M3060 conveys the printing medium to a position where the printing head H1001 is going to make a print on the printing medium. Thereafter, the print is made in the same manner as a normal printing operation is performed. After the print, the printing medium is discharged to the front tray M7010.

In a case where the flat-pass print is intended to be made successively, the printing medium on which the print has been made is removed from the front tray M7010, and the next printing medium is set thereon. After that, it is sufficient that the foregoing processes are repeated. Specifically, the subsequent print starts with the setting of a printing medium after the spur holder M3130 and the pinch roller holder M3000 are lifted up by pressing the flat-pass key E3004.

On the other hand, in a case where the flat-pass print is intended to be completed, the printing apparatus is returned to the normal printing mode by returning the front tray M7010 to the normal print position.

(G) Cleaning Section (Refer to FIGS. 15 and 16)

The cleaning section is a mechanism for cleaning the printing head H1001. The cleaning section is configured of a pump M5000, caps M5010, a wiper portion M5020 and the like. The caps M5010 are those which prevent the printing head H1001 from being dried out. The wiper portion M5020 is used for cleaning the surface of the printing head H1001 on which the ejection openings are formed.

Figure 18:
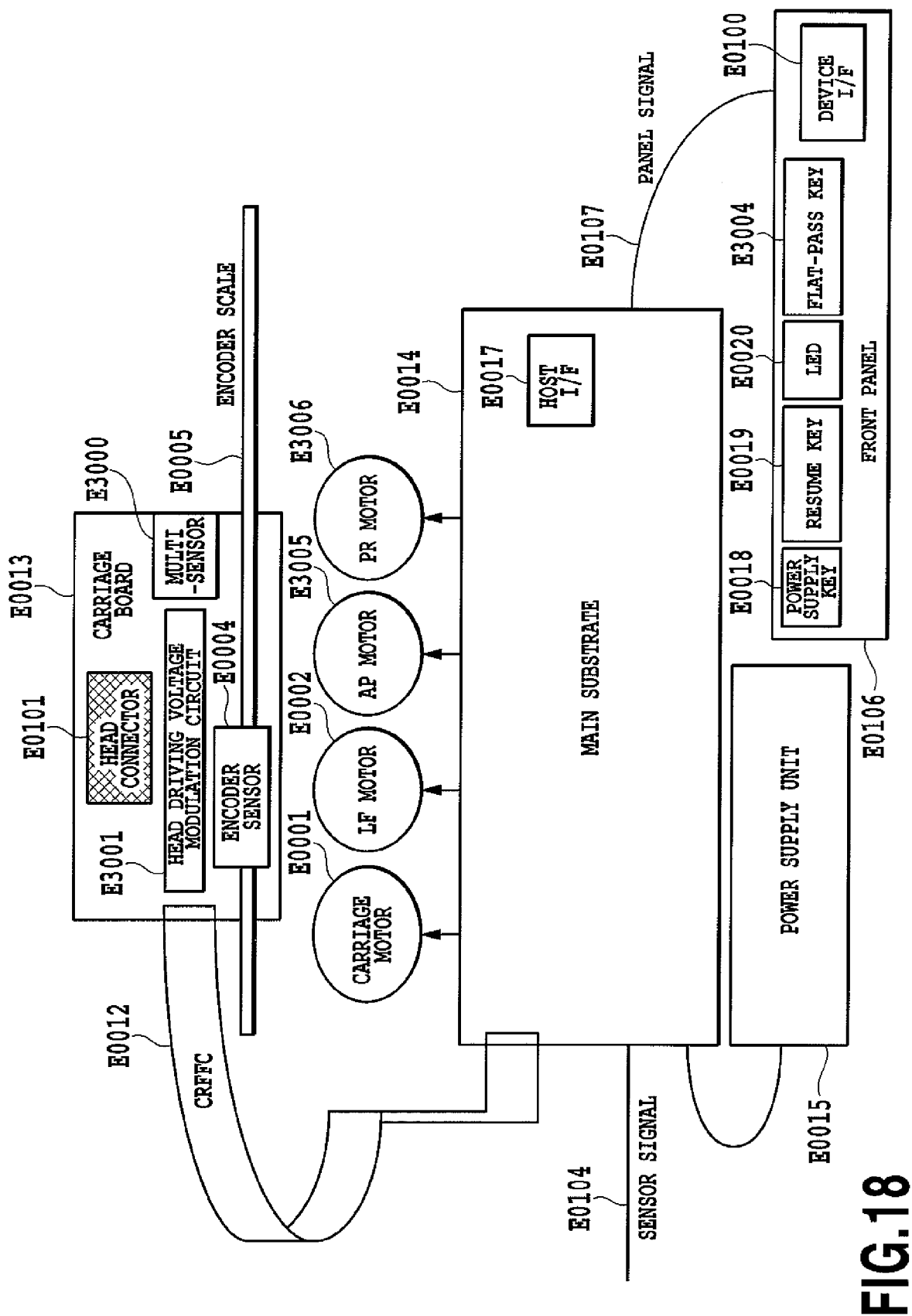
FIG. 18 is a block diagram schematically showing the entire configuration of an electrical circuit in the embodiment of the present invention.

In the case of this embodiment, a chief driving force of the cleaning section is transmitted from an AP motor E3005 (see FIG. 18). The pump M5000 is designed to be operated by rotation in one direction which is generated by means of a one-way clutch (not illustrated). The wiper portion M5020 and the caps M5010 are designed to ascend and descend by rotation in the other direction which is generated by the one-way clutch Incidentally, the AP motor E3005 is also used as a driving power supply for an operation of feeding printing medium, but a motor specialized for operating the cleaning section may be provided to the cleaning section instead.

The motor E0003 drives the caps M5010 so as for the caps M5010 to be capable of ascending and descending by means of an ascending/descending mechanism (not illustrated). When the caps M5010 go up to an ascending position, the caps M5010 cap each of the ejection faces of several ejecting portions provided to the printing head H1001. While no print operation is being performed, the caps M5010 can protect the printing head H1001. Otherwise, the caps M5010 can recover the printing head H1001 by suction. While a print operation is being performed, the caps M5010 can be placed in a descending position which prevents the caps M5010 from interfering with the printing head H1001. In addition, by opposing the caps M5010 to the ejection face, the caps M5010 are capable of receiving preliminary ejections. In a case where, for instance, the printing head H1001 is provided with ten ejecting portions, two caps M5010 are provided to the cleaning section in the illustrated example so that the ejection face corresponding to each five ejecting portions can be capped collectively by corresponding one of the two caps M5010.

A wiper portion M5020 made of an elastic member such as rubber is fixed to a wiper holder (not illustrated). The wiper holder is capable of moving in directions indicated by −Y and +Y in FIG. 16 (−Y and +Y are directions in which the ejection openings in the ejecting portions are arranged). When the printing head H1001 gets to the home position, the wiper holder moves in the direction indicated by an arrow −Y. Thereby, a surface of the printing head H1001 can be wiped. Once the wiping operation is completed, the carriage is caused to escape out of the range where the wiping operation is designed to be performed, and thus the wiper is returned to a position which prevents the wiper from interfering with the ejection face and the like. Incidentally, the wiper portion M5020 of this example is provided with a wiper blade M5020A for wiping the entire surface of the printing head H1001 including all of the ejection faces of the ejecting portions. In addition, the wiper portion M5020 is provided with the other two wiper blades M5020B and M5020C. The wiper blade M5020B wipes vicinities of nozzles for ejection faces of five of the ten ejecting portions, whereas the wiper blade M5020C wipes vicinities of nozzles for ejection faces of the other five of the ten ejecting portions.

After wiping, the wiper portion M5020 abuts on a blade cleaner M5060. Thereby, the wiper blades M5020A to M5020C are configured to be cleaned of inks and the like which have been adhered to themselves. In addition, the wiper portion M5020 has the following configuration (a wetting liquid transferring unit). A wetting liquid is transferred onto the wiper blades M5020A to M5020C before wiping. This enhances cleaning performance of the wiping operation. Descriptions will be provided later for a configuration of this wetting liquid transferring unit and the wiping operation.

The suction pump M5000 is capable of generating negative pressure in a state where an airtight space is formed inside the cap M5010 by connecting the cap M5010 to the ejection faces. Thereby, inks can be filled in the ejecting portions from the ink tanks H1900. In addition, dust, adhering matter, bubbles and the like which exist in the ejection openings and the internal ink passage leading to the ejection openings can be removed by suction.

What is used for the suction pump M5000 is, for example, a tube pump. This includes a member having a curved surface which is formed by squeezing and holding at least part of a flexible tube; a roller being capable of pressing the flexible tube towards the member; and a roller supporting part which supports the roller, and which is capable of rotating. Specifically, the roller supporting part is rotated in a predetermined direction, and thereby the roller is rolled on the member in which the curved surface has been formed, while pressing the flexible tube. In response to this, the negative pressure is generated in the airtight space formed by the cap M5010. This negative pressure sucks inks from the ejection openings, and subsequently sucks up the inks into the tube or the suction pump from the cap M5010. Thereafter, the sucked inks are further transferred to a suitable member (a waste ink absorbing member) provided inside the lower case M7080.

Note that an absorbing member M5011 is provided to the inside portion of the cap M5010 for the purpose of reducing the amount of inks remaining on the ejection faces of the printing head H1001 after the suction. In addition, consideration is made for sucking inks, which remain in the cap M5010 and the absorbing member M5011, in a state where the cap M5010 is opened, and for thus precluding the ink residue from coagulating and for accordingly preventing an adverse affect from occurring subsequently by sucking. It is desirable that no abrupt negative pressure should work on the ejection faces by providing an open-to-atmosphere valve (not illustrated) in a middle of the ink suction passage, and by thus beforehand opening the valve when the cap M5010 is intended to be detached from the ejection faces.

Furthermore, the suction pump M5000 can be operated not only for the purpose of the recovery by suction, but also for the purpose of discharging inks which have been received by the cap M5010 by the preliminary ejection operation performed in the state where the cap M5010 is opposite to the ejection faces. Specifically, when an amount of inks held in the cap M5010 after preliminary ejection reaches a predetermined amount, the inks held in the cap M5010 can be transferred to the waste ink absorbing member through the tube by operating the suction pump M5000.

The series of operations performed successively, such as the operations of the wiper portion M5020, the ascent/descent of the cap M5010 and the opening/closing of the valve, can be controlled by means of a main cam (not illustrated) provided on the output axle of the motor E0003, and a plurality of cams and arms and like which move so as to follow the main cam. Specifically, rotation of the main cam in response to a direction in which the motor E0003 rotates operates cams, arms and the like in each of the units and parts. Thereby, the predetermined operations can be performed. The position of the main cam can be detected with a position detection sensor such as a photo-interrupter.

(H) Wetting Liquid Transferring Unit (Refer to FIGS. 16 and 17)

Recently, inks containing pigment components as coloring agents (pigmented inks) are increasingly used for the purpose of enhancing the printing density, water resistance, light resistance of printed materials. Pigmented inks are produced through dispersing coloring agents themselves, which are originally solids, into water by adding dispersants thereto, or by introducing functional groups to pigment surfaces. Consequently, dried matter of pigmented inks resulting from drying the inks through evaporating moisture from the inks on the ejection faces damages the ejection faces more than dried coagulated matter of dyed inks in which the coloring agents are dissolved at molecular level. In addition, polymer compounds used for dispersing the pigments into the solvent are apt to be adsorbed to the ejection faces. This type of problem occurs in matter other than pigmented inks in a case where polymer compounds exist in the inks as a result of adding reactive liquids to the inks for the purpose of administering the viscosities of the inks, for the purpose of enhancing the light resistance of the inks, or for other purposes.

In this embodiment, a liquid is transferred onto, and adhered to, the blades of the wiper portion M5020, and thus the wiping operation is performed with the wetted blades M5020, in order to solve the foregoing problem. Thereby, the present embodiment attempts at preventing the ejection faces from deteriorating due to the pigmented inks, at reducing the abrasion of the wiper, and at removing the accumulated matter by dissolving the ink residue accumulated on the ejection faces. Such a liquid is termed as the wetting liquid from the viewpoint of its function in the description. The wiping by use of this liquid is termed as the wet wiping.

This embodiment adopts a configuration in which the wetting liquid is stored inside the main body of the printing apparatus. Reference numeral M5090 denotes a wetting liquid tank. As the wetting liquid, a glycerin solution or the like is contained in the wetting liquid tank M5090. Reference numeral M5100 denotes a wetting liquid holding member, which is fibrous member or the like. The wetting liquid holding member M5100 has an adequate surface tension for the purpose of preventing the wetting liquid from leaking from the wetting liquid tank M5090. The wetting liquid holding member M5100 is impregnated with, and holds, the wetting liquid. Reference numeral M5080 denotes a wetting liquid transferring member, which is made, for example, of a porous material having an adequate capillary force. The wetting liquid transferring member M5080 includes a wetting liquid transferring part M5081 which is in contact with the wiper blade. The wetting liquid transferring member M5080 is also in contact with the wetting liquid holding member M5100 infiltrated with the wetting liquid. As a result, the wetting liquid transferring member M5080 is also infiltrated with the wetting liquid. The wetting liquid transferring member M5080 is made of the material having the capillary force which enables the wetting liquid to be supplied to the wetting liquid transferring part M5081 even if a smaller amount of wetting liquid remains Descriptions will be provided for operations of the wetting liquid transferring unit and the wiper portion.

First of all, the cap M5010 is set at the descending position, and thus is escaped to a position where the carriage M4000 does not contact the blades M5020A to M5020C, In this state, the wiper portion M5020 is moved in the −Y direction, and is caused to pass through the part of the blade cleaner M5060. Accordingly, the wiper portion M5020 is caused to abut on the wetting liquid transferring part M5081 (refer to FIG. 17). By keeping the wiper portion M5020 in contact with the wetting liquid transferring part M5081 for an adequate length of time, an adequate amount of wetting liquid is transferred onto the wiper portion M5020.

Subsequently, the wiper portion M5020 is moved in the +Y direction. The blade contacts the blade cleaner M5060 only in a part of the surface of the blade cleaner M5060, and no wetting liquid is adhered to the part. For this reason, the wetting liquid remains to be held on the blade.

The blade is returned to the position where the wiping operation has been started. Thereafter, the carriage M4000 is moved to the position where the wiping operation is designed to be performed. Subsequently, the wiper portion M5020 is moved in the −Y direction. Thereby, the ejection faces of the printing head H1001 can be wiped with the surface to which the wetting liquid is adhered.

1.3 Configuration of Electrical Circuit

Descriptions will be provided next for a configuration of an electrical circuit of this embodiment.

FIG. 18 is a block diagram for schematically describing the entire configuration of the electrical circuit in the printing apparatus J0013. The printing apparatus to which this embodiment is applied is configured chiefly of the carriage board E0013, the main substrate E0014, a power supply unit E0015, a front panel E0106 and the like.

The power supply unit E0015 is connected to the main substrate E0014, and thus supplies various types of drive power.

The carriage board E0013 is a printed circuit board unit mounted on the carriage M4000. The carriage board E0013 functions as an interface for transmitting signals to, and receiving signals from, the printing head H1001 and for supplying head driving power through the head connector E0101. The carriage board E0013 includes a head driving voltage modulation circuit E3001 with a plurality of channels to the respective ejecting portions of the printing head H1001. The plurality of ejecting portions corresponding respectively to the plurality of mutually different colors. In addition, the head driving voltage modulation circuit E3001 generates head driving power supply voltages in accordance with conditions specified by the main substrate E0014 through the flexible flat cable (CRFFC) E0012. In addition, change in a positional relationship between the encoder scale E0005 and the encoder sensor E0004 is detected on the basis of a pulse signal outputted from the encoder sensor E0004 in conjunction with the movement of the carriage M4000. Moreover, the outputted signal is supplied to the main substrate E0014 through the flexible flat cable (CRFFC) E0012.

Figure 20:
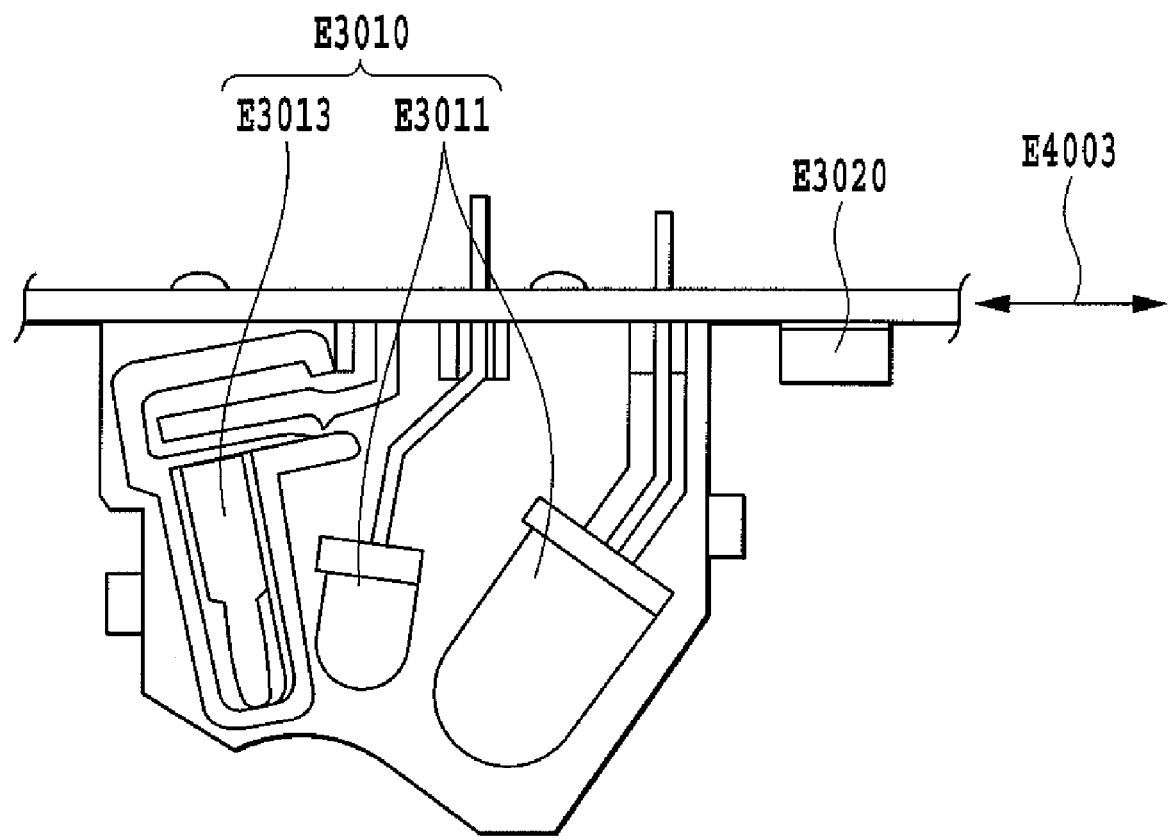
FIG. 20 is a diagram showing an example of a configuration of a multisensor system mounted on a carriage board shown in FIG. 18.

An optical sensor E3010 and a thermistor E3020 are connected to the carriage board E0013, as shown in FIG. 20. The optical sensor E3010 is configured of two light emitting devices (LEDs) E3011 and a light receiving element E3013. The thermistor E3020 is that with which an ambient temperature is detected. Hereinafter, these sensors are referred to as a multisensor system E3000. Information obtained by the multisensor system E3000 is outputted to the main substrate E00014 through the flexible flat cable (CRFFC) E0012.

The main substrate E0014 is a printed circuit board unit which drives and controls each of the sections of the ink jet printing apparatus of this embodiment. The main substrate E0014 includes a host interface (host I/F) E0017 thereon. The main substrate E0014 controls print operations on the basis of data received from the host apparatus J0012 (FIG. 1). The main substrate E0014 is connected to and controls various types of motors including the carriage motor E0001, the LF motor E0002, the AP motor E3005 and the PR motor E3006. The carriage motor E0001 is a motor serving as a driving power supply for causing the carriage M4000 to perform main scan. The LF motor E0002 is a motor serving as a driving power supply for conveying printing medium. The AP motor E3005 is a motor serving as a driving power supply for causing the printing head H1001 to perform recovery operations. The PR motor E3006 is a motor serving as a driving power supply for performing a flat-pass print operation; and the main substrate E0014 thus controls drive of each of the functions. Moreover, the main substrate E0014 is connected to sensor signals E0104 which are used for transmitting control signals to, and receiving detection signals from, the various sensors such as a PF sensor, a CR lift sensor, an LF encoder sensor, and a PG sensor for detecting operating conditions of each of the sections in the printer. The main substrate E0014 is connected to the CRFFC E0012 and the power supply unit E0015. Furthermore, the main substrate E0014 includes an interface for transmitting information to, and receiving information from a front panel E0106 through panel signals E0107.

The front panel E0106 is a unit provided to the front of the main body of the printing apparatus for the sake of convenience of user's operations. The front panel E0106 includes the resume key E0019, the LED guides M7060, the power supply key E0018, and the flat-pass key E3004 (refer to FIG. 6). The front panel E0106 further includes a device I/F E0100 which is used for connecting peripheral devices, such as a digital camera, to the printing apparatus.

Figure 19:
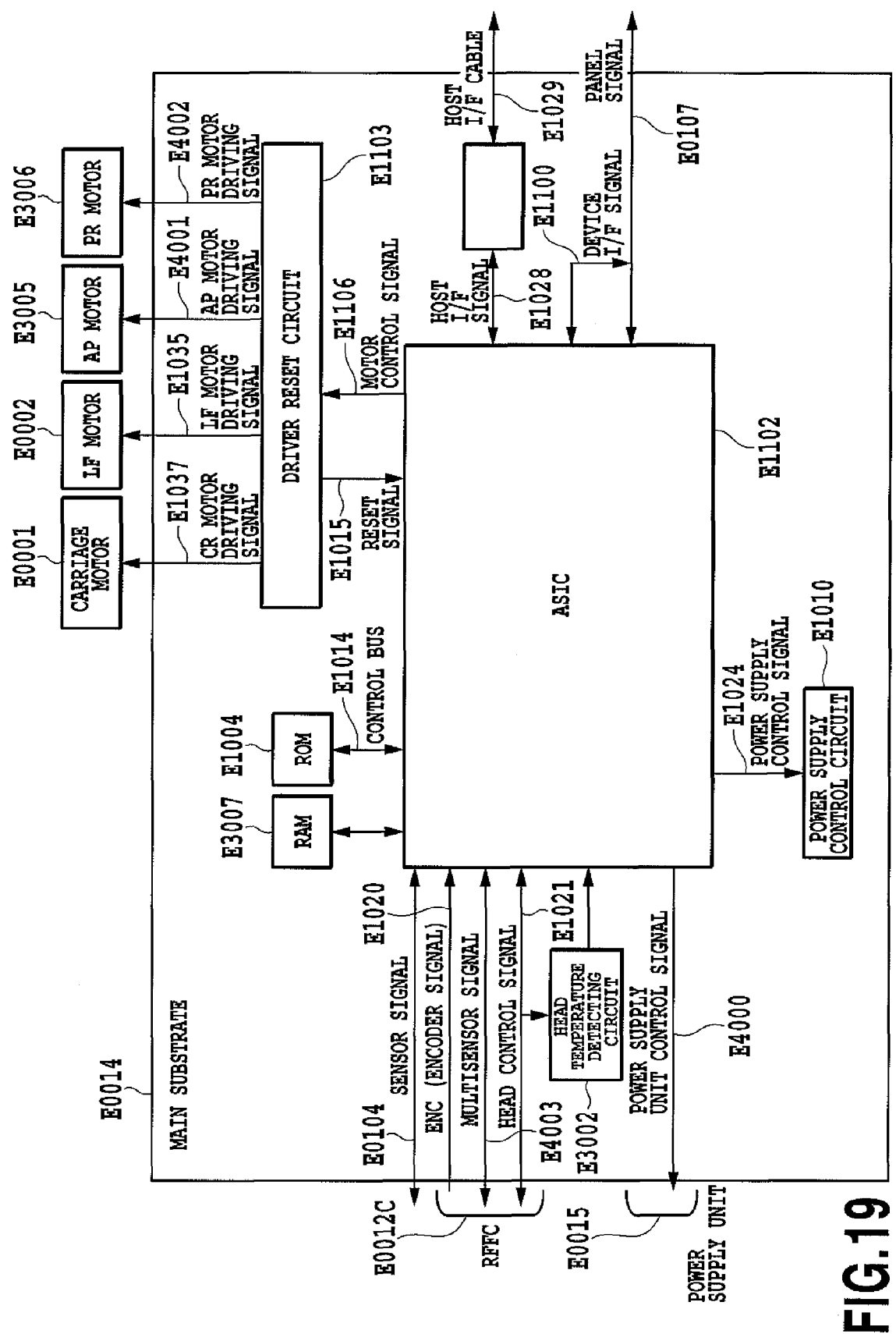
FIG. 19 is a block diagram showing an example of an internal configuration of a main substrate shown in FIG. 18.

FIG. 19 is a block diagram showing an internal configuration of the main substrate E1004.

In FIG. 19, reference numeral E1102 denotes an ASIC (Application Specific Integrated Circuit). The ASIC E1102 is connected to a ROM E1004 through a control bus E1014, and thus performs various controls in accordance with programs stored in the ROM E1004. For example, the ASIC E1102 transmits sensor signals E0104 concerning the various sensors and multisensor signals E4003 concerning the multisensor system E3000. In addition, the ASIC E1102 receives sensor signals E0104 concerning the various sensors and multisensor signals E4003 concerning the multisensor system. Furthermore, the ASIC E1102 detects encoder signals E1020 as well as conditions of outputs from the power supply key E0018, the resume key E0019 and the flat-pass key E3004 on the front panel E0106. In addition, the ASIC E1102 performs various logical operations, and makes decisions on the basis of conditions, depending on conditions in which the host I/F E0017 and the device I/F E0100 on the front panel are connected to the ASIC E1102, and on conditions in which data are inputted. Thus, the ASIC E1102 controls the various components, and accordingly drives and controls the ink jet printing apparatus.

Reference E1103 denotes a driver reset circuit. In accordance with motor controlling signals E1106 from the ASIC E1102, the driver reset circuit E1103 generates CR motor driving signals E1037, LF motor driving signals E1035, AP motor driving signals E4001 and PR motor driving signals 4002, and thus drives the motors. In addition, the driver reset circuit E1103 includes a power supply circuit, and thus supplies necessary power to each of the main substrate E0014, the carriage board E0013, the front panel E0106 and the like. Moreover, once the driver reset circuit E1103 detects drop of the power supply voltage, the driver reset circuit E1103 generates reset signals E1015, and thus performs initialization.

Reference numeral E1010 denotes a power supply control circuit. In accordance with power supply controlling signals E1024 outputted from the ASIC E1102, the power supply control circuit E1010 controls the supply of power to each of the sensors which include light emitting devices.

The host I/F E0017 transmits host I/F signals E1028, which are outputted from the ASIC E1102, to a host I/F cable E1029 connected to the outside. In addition, the host I/F E0017 transmits signals, which come in through this cable E1029, to the ASIC E1102.

Meanwhile, the power supply unit E0015 supplies power. The supplied power is supplied to each of the components inside and outside the main substrate E0014 after voltage conversion depending on the necessity. Furthermore, power supply unit controlling signals E4000 outputted from the ASIC E1102 are connected to the power supply unit E0015, and thus a lower power consumption mode or the like of the main body of the printing apparatus is controlled.

The ASIC E1102 is a single-chip semiconductor integrated circuit incorporating an arithmetic processing unit. The ASIC E1102 outputs the motor controlling signals E1106, the power supply controlling signals E1024, the power supply unit controlling signals E4000 and the like. In addition, the ASIC E1102 transmits signals to, and receives signals from, the host I/F E0017. Furthermore, the ASIC E1102 transmits signals to, and receives signals from, the device I/F E0100 on the front panel by use of the panel signals E0107. As well, the ASIC E1102 detects conditions by means of the sensors such as the PE sensor and an ASF sensor with the sensor signals E0104. Moreover, the ASIC E1102 controls the multisensor system E3000 with the multisensor signals E4003, and thus detects conditions. In addition, the ASIC E1102 detects conditions of the panels signals E0107, and thus controls the drive of the panel signals E0107. Accordingly, the ASIC E1102 turns on/off the LEDs E0020 on the front panel.

The ASIC E1102 detects conditions of the encoder signals (ENC) E1020, and thus generates timing signals. The ASIC E1102 interfaces with the printing head H1001 with head controlling signals E1021, and thus controls print operations. In this respect, the encoder signals (ENC) E1020 are signals which are receives from the CRFFC E0012, and which have been outputted from the encoder sensor E0004. In addition, the head controlling signals E1021 are connected to the carriage board E0013 through the flexible flat cable E0012. Subsequently, the head controlling signals E1021 are supplied to the printing head H1001 through the head driving voltage modulation circuit E3001 and the head connector E0101. Various types of information from the printing head H1001 are transmitted to the ASIC E1102. Signals representing information on head temperature of each of the ejecting portions among the types of information are amplified by a head temperature detecting circuit E 3002 on the main substrate, and thereafter the signals are inputted into the ASIC E1102. Thus, the signals are used for various decisions on controls.

In the figure, reference numeral E3007 denotes a DRAM. The DRAM E3007 is used as a data buffer for a print, a buffer for data received from the host computer, and the like. In addition, the DRAM is used as work areas needed for various control operations.

1.4 Configuration of Printing Head

Descriptions will be provided below for a configuration of the head cartridge H1000 to which this embodiment is applied.

The head cartridge H1000 in this embodiment includes the printing head H1001, means for mounting the ink tanks H1900 on the printing head H1001, and means for supplying inks from the respective ink tanks H1900 to the printing head H1001. The head cartridge H1000 is detachably mounted on the carriage M4000.

Figure 21:
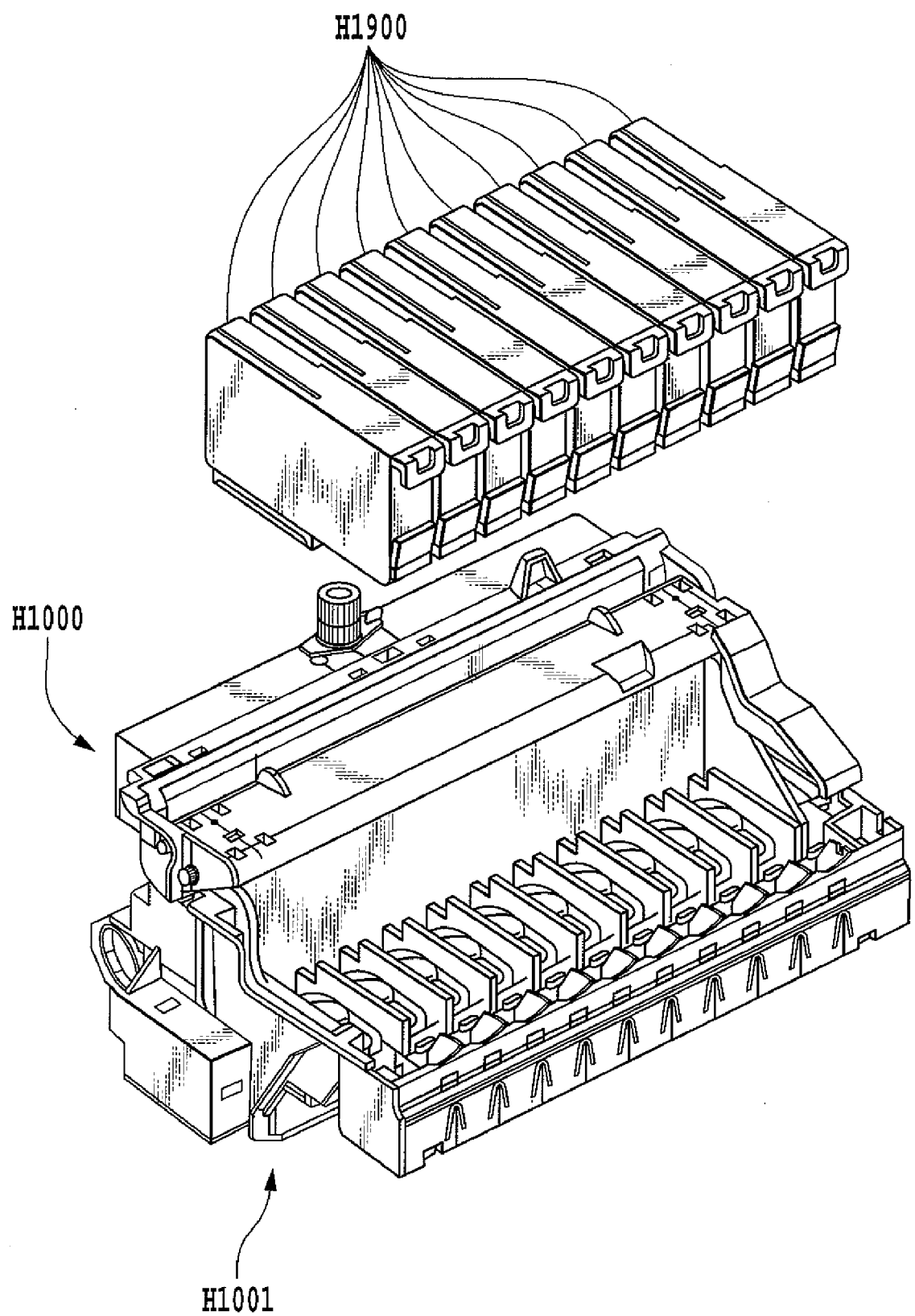
FIG. 21 is a perspective view of a head cartridge and ink tanks applied in the embodiment, which shows how the ink tanks are attached to the head cartridge.

FIG. 21 is a diagram showing how the ink tanks H1900 are attached to the head cartridge H1000 to which this embodiment is applied. The printing apparatus of this embodiment forms an image by use of the pigmented inks corresponding respectively to the ten colors. The ten colors are cyan (C), light cyan (Lc), magenta (M), light magenta (Lm), yellow (Y), black 1 (K1), black 2 (K2), red (R), green (G) and gray (Gray). For this reason, the ink tanks H1900 are prepared respectively for the ten colors. As shown in FIG. 21, each of the ink tanks can be attached to, and detached from, the head cartridge H1000. Incidentally, the ink tanks H1900 are designed to be attached to, and detached from, the head cartridge H1000 in a state where the head cartridge H1000 is mounted on the carriage M4000.

1.5 Configuration of Inks

Descriptions will be provided below for the ten color inks used in the present invention.

The ten colors used in the present invention are cyan (C), light cyan (Lc), magenta (M), light magenta (Lm), yellow (Y), black 1 (K1), black 2 (K2), gray (Gray), red (R) and green (G). It is desirable that all of the coloring agents used respectively for the ten colors should be pigments. In this respect, for the purpose of dispersing the pigments, publicly known dispersants may be used. Otherwise, for the purpose, it is sufficient that pigments surfaces are modified by use of a publicly known method, and that self-dispersants are added thereto. In addition, coloring agents used for at least some of the colors may be dyes as long as the use agrees with the spirit and scope of the present invention. Furthermore, coloring agents used for at least some of the colors may be what are obtained by harmonizing pigments and dyes in color, and a plurality of kinds of pigments may be included therein. Moreover, as for the ten colors of the present invention at least one kind of substance selected from the group consisting of an aqueous organic solvent, an additive, a surfactant, a binder and an antiseptic may be included in therein as long as the inclusion is within the spirit and the scope of the present invention.

In these embodiments, first black (K1), second black (K2) and gray (Gray) are all achromatic color and by appropriately adjusting the pigment concentration, solvent component and the proportions in the ink, their permeability and color properties on the printing medium can be made different. First black has low permeability and because it stays on the surface of the printing medium easily, it is actively used in high concentration areas. second black has high permeability and even when applied at the same time as other colors it does not mix with them on the surface of the printing medium and is quickly absorbed by the printing medium. Accordingly, necessary corrections in concentrations ranging from intermediate to high are used by means of chromatic colors in order to maintain a fine gray balance. The pigment concentration for gray (light black) is kept even lower than for other blacks and is used in low to intermediate concentration areas in which the granularity easily stands out.

The inks used for printing in the inkjet printing apparatus of these embodiments are made different depending on the type of printing medium. For example, first black (K1), gray (Gray) light cyan (Lc) and light magenta (Lm) are used on printing media that are not glossy such as regular paper or art paper. Furthermore, for glossy printing media such as glossy paper or special photographic paper second black (K2), gray (Gray), light cyan (Lc) and light magenta (Lm) are used. Additionally, for special high quality paper on which the differences in permeability of first black (K1) and second black (K2) can be seen on the printing medium as differences in concentration, first black (K1), second black (K2), gray (Gray), light cyan (Lc) and light magenta (Lm) are used.

Next, an explanation regarding the specifics of the preferable materials comprising the 10 colored inks used in this invention will be given below.

(Regarding Coloring Agents)

Chromatic pigments are acknowledged as color pigments and specifically deeply dyed lake-based pigments such as acid dye-based lakes and basic dye-based lakes, insoluble pigments such as monoazo yellow, disazo yellow, the β-naphthol series, the naphthol AS series, the pyrazolone series, the benzimidazolone series, condensed azo pigments, azolake pigments, condensed polycyclic pigments such as the phthalocyanine series, the quinacridone series, the anthraquinone series, the perylene series, the indigo series, the dioxazine series, the quinophthalone series, the isoindolinone series and the diketopyrrolopyrrole series may be cited and needless to say one is not limited to just these, other organic dyes may be used.

Carbon black is ideal as the pigment used in the black pigments. For example, it is possible to use any of the carbon blacks such as furnace black, lampblack, acetylene black and channel black. Also, it is also possible to use carbon black that has been separately and newly prepared for this invention. However, this invention is not limited to the above and it is also possible to use any conventional, well-known carbon black. Further, one is not limited to carbon black and fine magnetic particles of such substances as magnetite and ferrite or titanium black may also be used as black pigments.

Here, any well-know general dispersing agent may be used in order to carry out dispersion of the pigments, the pigment surfaces may be modified by any well-know general method to give self-dispersibility.

Furthermore, it is possible to add water-soluble organic solvents, additives, surfactants and preservatives to the ink and it is possible to use any variously generally well-known materials for them.

(Ink Composition)

Here, an example of the composition of the 10 color pigment-based inks that may be used in this invention will be given. Further, the bronze properties of these pigment-based inks are shown, for example, in FIG. 23.

(a) Aqueous Carrier Medium

The aqueous carrier medium is water or a mixture of water and at least one type of water-soluble organic medium. Because the appropriate mixture is selected in accordance with its specific use, it is selected, for example, in accordance with the desired surface tension and viscosity, the selected coloring agents, the ink drying period and the type of printing medium to be used on which the ink will be printed. An example of a selectable water-soluble organic medium is shown in the U.S. Pat. No. 5,085,698. A mixture of water and a polyvalent alcohol, for example, diethelyne glycol, is preferred as the water-soluble carrier medium. If a mixture of water and a water-soluble medium is used, the approximately 30 to approximately 95% water content is balanced by the contained amount of the water-soluble medium (that is, 70 to 5%). Furthermore, depending on the type of coloring agent selected, the aqueous carrier medium forms from 70 to 99.8% of the total weight of the composition of the ink. It is preferable if the aqueous carrier medium forms from 94 to 99.8% when an organic pigment is selected and from 70 to 99.8% when an inorganic pigment is selected.

(b) Pigments

Pigments cover a wide range of organic and inorganic pigments that are used independently or in combinations. Pigment particles are sufficiently small so that the ink can flow freely inside the inkjet printer and particularly in the discharge outlets which have a diameter of 10 μm to 50 μm. Furthermore, the particle diameter has an effect on pigment dispersion stability which is required over the life of the ink. Brownian motion caused by the minute particles likely contributes to preventing particle precipitation. Additionally, by using small particles, the greatest color concentration can be determined. The particle diameter practicable for this invention is approximately 0.005 μm to 15 μm, preferably 0.005 to 0.5 μm and most preferably 0.01 μm to 0.3 μm.

It is possible to use the selected pigments in their dried state or wet state (that is, a condensed mass). In their condensed mass state the pigments will not agglutinate as long as they are in their dried state. Consequently, decondensation is not necessary in the preparation process of the inks. Representative dried and presscake pigments used to implement this invention are shown in the U.S. Pat. No. 5,085,698.

It is also possible to use minute metal or metal oxide particles to implement this invention. For example, metals and metal oxides are suitable for preparing inkjet inks with magnetic properties. Oxides having minute particles can be selected from, for example, silica, alumina and titanium dioxide. Additionally, for fine metallic particles it is possible to select, for example, copper, iron, steel, aluminum and alloys when appropriate.

When using organic pigments, it is possible for the inks to contain pigments of approximately 30 wt % in the weight of the entire ink with respect to use in almost all inkjet printing. However, the wt % in the entire weight of the ink is generally 1 to 15 and preferably approximately 1 to 8. When selecting inorganic pigments, because inorganic pigments have greater specific gravity compared to organic pigments, with inks using inorganic pigments compared to those using organic pigments the tendency is for them to have an increased pigment content rate and their percent by weight can be as high as approximately 50%.

(c) Dispersant

As polymerized dispersants, random polymers and structural polymer dispersants, for example, block copolymers, branched polymers or graft polymers may be cited. Polymers are anion-based, cation-based or nonionic-based. Because random polymers as structural polymers do not show results in which the coloring agent dispersion is allowed to stabilize, they are not the polymers of choice. However, random polymers that have both hydrophilic moiety for water stability and hydrophobic moiety for mutual interaction with coloring agents and that have an average molecular weight that contributes to dispersion stability can be effectively used to implement this invention. Such polymer dispersants are presented in the U.S. Pat. No. 4,597,794.

The above-mentioned block polymers have an AB, a BAB and an ABC structure. Block polymers that have both hydrophobic blocks and hydrophilic blocks or have a block size which is in equilibrium that contributes to dispersion stability are favored for implementing this invention. It is possible for functional groups to be incorporated into a hydrophobic block (blocks in which coloring agents are included) and because of this the specific interaction between the polymer dispersant and the coloring agent can be even further enhanced in order to improve dispersion stability. The details of these polymers are presented in the U.S. Pat. Nos. 5,085,698 and 5,272,201 and additionally in the European Patent Laid-Open No. 0 556 649 A1. Several useful graft polymers are disclosed in the U.S. Pat. No. 5,231,131.

The quantity of the polymer depends on the structure of the said polymer, its molecular weight, other characteristics and other components in the composition of the ink. The average molecular weight of the dispersant polymer selected to implement this invention is less than 40,000, preferably less than 20,000 and most preferably in the range of 2,000 to 10,000.

The contained amount of the polymer dispersant is based on the total weight of the composition of the ink and is from 0.1 to 25 wt % and preferably 0.1 to 8 wt %. When the contained amount of the polymer dispersant is higher than this range, it is difficult to maintain the desired ink viscosity. When the polymer is in ample supply, it has an adverse effect on dispersion stability.

(d) Surfactant Mixture

As surfactants, it is possible to use nonionic surfactants, siloxane surfactants and fluorinating surfactants. The surfactant mixture is based on the total weight of the composition of the ink and is 0.5 to 5 wt % and preferably 1.0 to 3 wt %.

(e) Ink Composition

In the preparation of the ink, selected insoluble coloring agents, for example, pigments and dispersants, are premixed in the aqueous carrier medium and then the said coloring agents are dispersed or decondensation is carried out. This process can be executed with a horizontal mini-mill, a ball-mill or grinder. Or it can be accomplished by having the mixture pass through numerous nozzles in the liquid jet interaction chamber under a fluid pressure of at least 100 psi in order to produce a homogeneous coloring agent dispersant in the aqueous carrier medium.

1. Characteristic Structures

First Embodiment

This invention is characterized by having an ink use method which reduces "bronze unevenness". As already explained in FIG. 23, there are instances when bronze colors (regular reflected light) are different depending on the type of ink. In this invention, using ink with these different bronze colors (regular reflected light colors) is taken as the premise.

Based on this premise, in the embodiments of this invention a sense of incongruity from differences in bronze colors (bronze unevenness) is to be reduced and the method for using numerous types of inks will be different from conventional methods. Specifically, when using inks with different bronze colors (regular reflected light colors) and reproducing the specific color region, rather than carrying out conventional, typical color separation processing, color separation processing is achieved so as to reduce the bronze unevenness. An explanation is given below regarding such a characteristic color separation processing.

Figure 24:
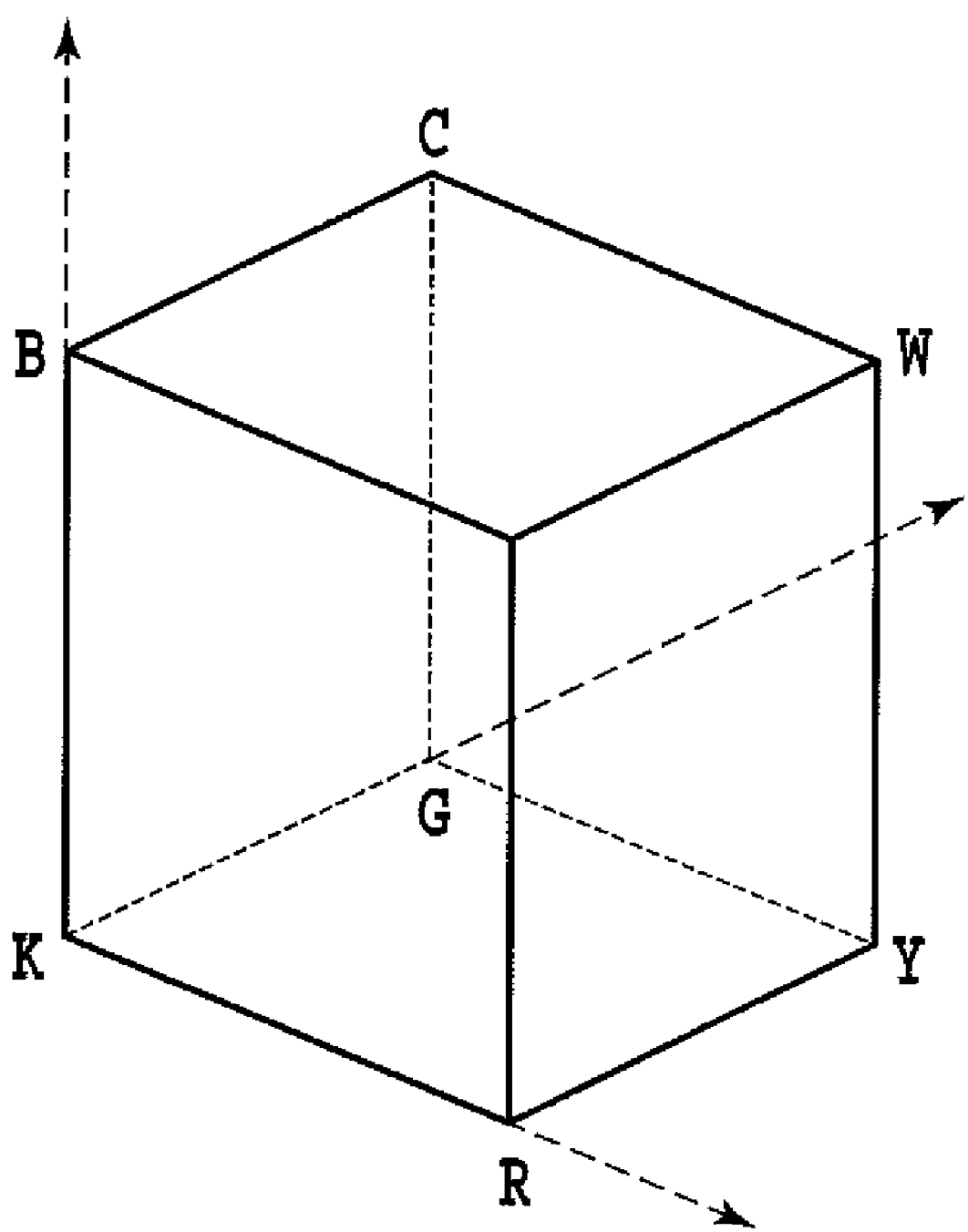
FIG. 24 is a conceptual diagram of the color separation table used in the subsequent process J0003.

FIG. 24 is a diagram showing in conceptual form the color separation table used in the subsequent process J0003. The lattice points of the color separation table are defined to be in the RGB space, an explanation is given below about the various lattice points and the data relating to the amount of ink for each ink is correspondingly attached.

Figure 25A:
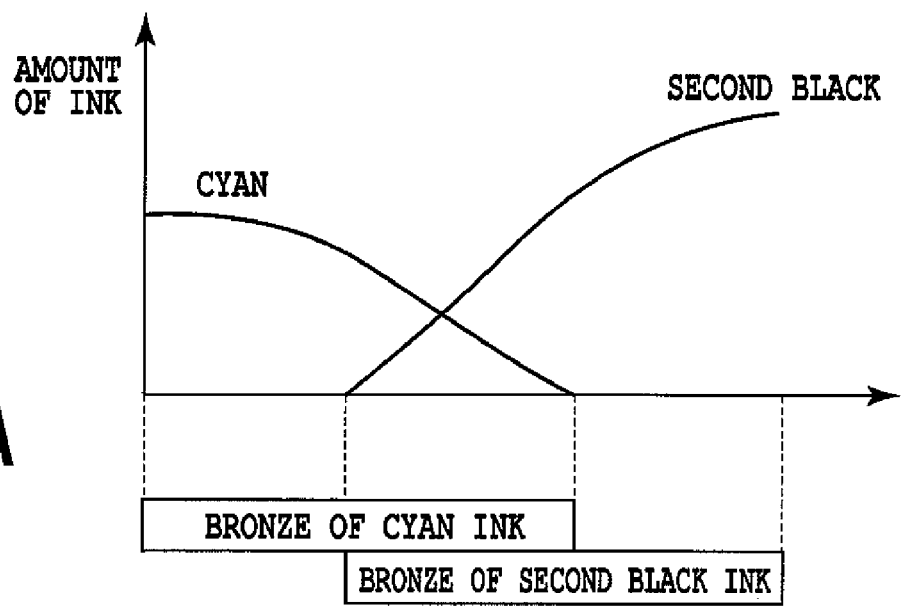
FIGS. 25A and 25B are examples of ink use methods when printing the color region in which cyan ink and second black of Embodiment 1 of this invention were used.

FIG. 25A shows conventional, typical color separation processing and is a diagram showing a conventional ink use method with the lattice points of lines connecting C (cyan) and K (second black) shown in FIG. 24. Furthermore, the horizontal axis shows the hue from the point of maximum concentration due to the chromatic color ink (C) to the point of maximum concentration from the achromatic color ink (K) while the vertical axis shows the quantity of ink used. As illustrated in FIG. 23, the bronze colors (regular reflected light color) of the cyan ink and the black ink used here differ from each other. Specifically, the bronze color of the cyan ink appears to be tinged with red and the bronze color of the second black ink appears to be tinged with yellow. Consequently, as shown in FIG. 25A, when the second black ink increases in its course with the attendant decrease in the cyan ink, the bronze color at the ink changeover part changes from tinged with red to tinged with yellow. Specifically, in the area where only cyan ink is used red bronze can be seen due to the cyan ink. When the cyan ink decreases and the area are reached where second black ink is used alone, the yellow bronze due to the second black ink appears. As a result, a difference in the bronze color is produced at the ink changeover part and a sense of incongruity is created due to the difference of these bronze colors.

On the other hand, FIG. 25B shows the color separation processing of this embodiment and shows the ink use method for the lattice points of the ink (color region from C to K) in which C (cyan) and K (second black) are connected. Furthermore, the horizontal axis indicates the hue from the cyan to the black and the vertical axis shows the amount of ink used. In this embodiment, as shown in FIG. 25B the use of cyan ink in its course is not stopped and cyan ink continues to be used over the entire area up to the maximum concentration point of the black. In this way the bronze color of the cyan ink appears in the entire area from cyan to black and a sense of incongruity due to the different bronzes is suppressed. At this time, the sufficient quantity of the cyan ink printed along with the second black at the point of maximum concentration of the black must be printed so that only the effect from the particular bronze of the cyan ink is given.

For the cyan ink and the second black ink used in this embodiment, taking the quantity of ink for printing at the point of maximum black concentration as 100%, printing is carried out with second black ink being 96% and the cyan ink being 4%. By doing this, it is possible for the bronze of the cyan ink to have an effect at the point of maximum concentration of the black. In this manner, by continuing to use either one or both inks from the cyan over the entire black area and having a bronze color produced that tends to be the same over the entire area, it is possible to inhibit bronze unevenness caused by the change in the bronze color.

Furthermore, the ink use method for expressing the line from white to cyan is not illustrated in FIG. 25 but from the white up to the cyan, the cyan ink increases by slow degrees.

In this embodiment an example was given regarding the expression of a white-cyan-black hue using cyan ink and second black ink but it is also applicable when combining achromatic color inks and chromatic color inks in which the bronze colors are mutually dissimilar. Furthermore, an ink use method has been described between two types of ink but it may also be applied between three or more types of ink. For this embodiment, when expressing a color between two inks that have different regular reflected light colors (bronze colors), either one or both may be used in the entire area between the inks.

Second Embodiment

Next, an explanation will be given regarding the second embodiment. The same inkjet printing apparatus is used in this embodiment as was used in the above-described embodiment.

In this embodiment an explanation will be given regarding the ink use method with respect to the lattice points of the line connecting the colors (chromatic color) and the colors (chromatic color) shown in FIG. 24. Furthermore, the horizontal axis of FIG. 26 shows the hue from the point of maximum concentration from the chromatic color ink (C) up to the point of maximum concentration from another chromatic color ink (Y) while the vertical axis shows the ink use quantity.

Figure 26A:
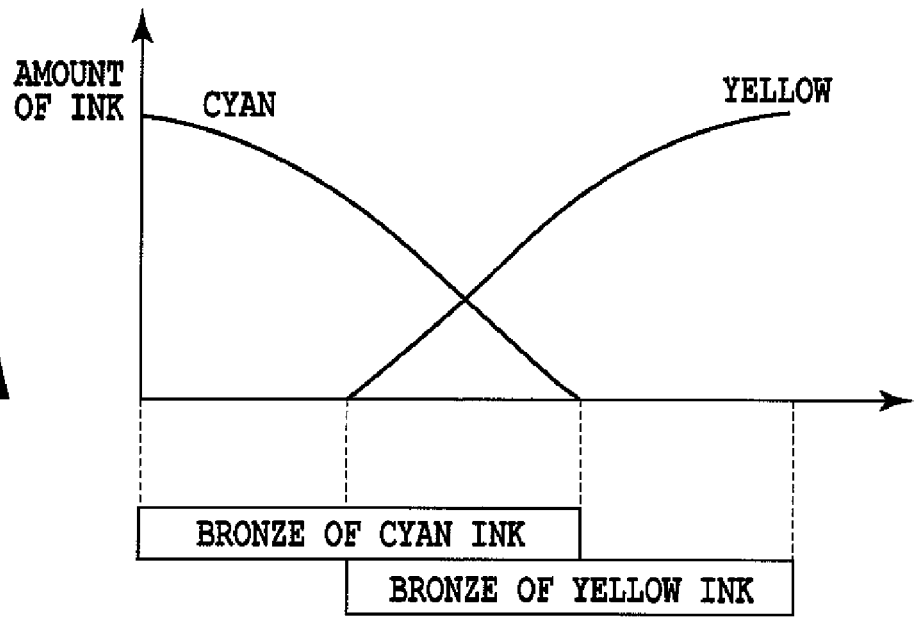
FIGS. 26A and 26B are examples of ink use methods when printing the color region in which cyan ink and yellow ink of Embodiment 2 of this invention are used.
Figure 26B:
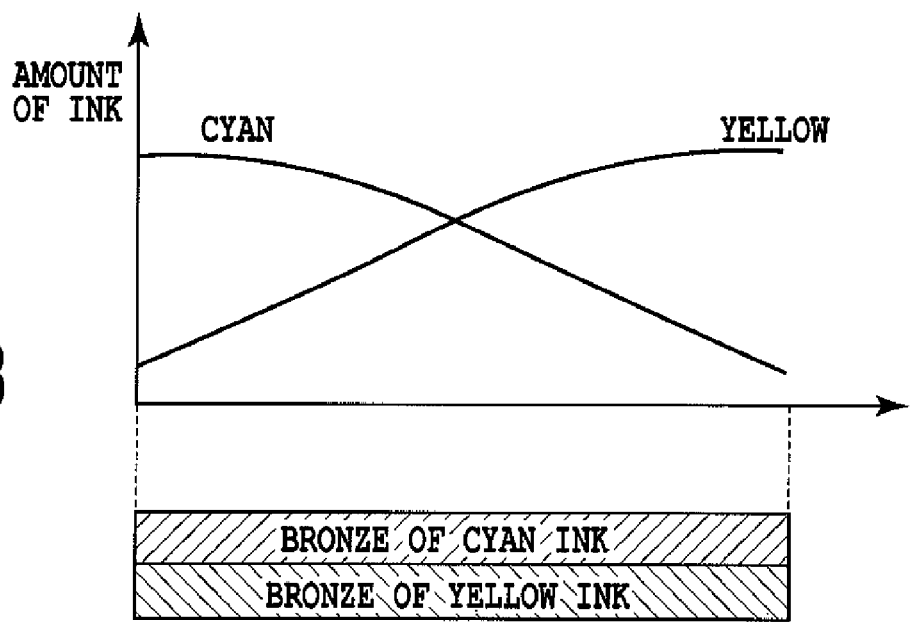

FIG. 26A is a diagram showing a conventional ink use method for the lattice points of the line connecting C (cyan), G (gray) and Y (yellow) in the RGB space shown in FIG. 24. This cyan (C)-gray (G)-yellow (Y) line is expressed using cyan ink and yellow ink. On the other hand, FIG. 26B shows the ink use method in these embodiments with respect to the same lattice point line. As shown in FIG. 23, the bronze color of the cyan ink used here appears to be tinged with red and the bronze color of the yellow ink appears to be tinged with pale. In FIG. 26A, the yellow ink increases in its course as the cyan ink decreases. As a result, the bronze color at the ink changeover part changes from a tinged with red color to a tinged with pale color. Specifically, in the area where only cyan ink is used red bronze can be seen due to the cyan ink and when the cyan ink decreases and the area is reached where yellow ink is used alone, a pale bronze due to the yellow ink appears. As a result, a difference in the bronze color is produced at the ink changeover part and a sense of incongruity is created due to the difference of this bronze color.

On the other hand, in this embodiment cyan ink and yellow ink are both used over the entire area from cyan to yellow. Because of this, a bronze of the cyan ink and yellow ink is generated over the entire cyan-yellow area and a change in the bronze color is suppressed.

Furthermore, the ink used in the entire cyan-yellow area at a minimum may be either one of the cyan or yellow ink and it is permissible if the same bronze tends to be generated over the entire area. For example, by using cyan ink over the entire area, a bronze of cyan ink is generated in the entire cyan-green-yellow area and this inhibits changes in the bronze color. In a similar manner, when yellow ink is used over the entire area, a bronze of yellow ink is generated in the entire cyan-green-yellow area and this inhibits changes in the bronze color.

In this embodiment, al least one of the cyan ink and the yellow ink is used in the entire cyan-yellow area and changes in the bronze are inhibited at the changeover part of the inks.

Furthermore, in this embodiment cyan ink and yellow ink are used and shown as the case in which a cyan-green-yellow hue is expressed but it is possible to use them in combination with other chromatic color inks which have mutually different bronze hues. Additionally, in this embodiment an ink use method between two types of ink is described but it may also be used between three or more types of ink.

Third Embodiment

Next, an explanation will be given regarding a third embodiment. In this embodiment the same inkjet printing apparatus is used as in the above-described embodiment.

In this embodiment an explanation will be given regarding the ink use method when expressing the gray line. Furthermore, the horizontal axis in FIG. 27 shows the hue from white to the maximum concentration point from the achromatic color ink (K) and the vertical axis shows the ink use quantity.

Figure 27A:
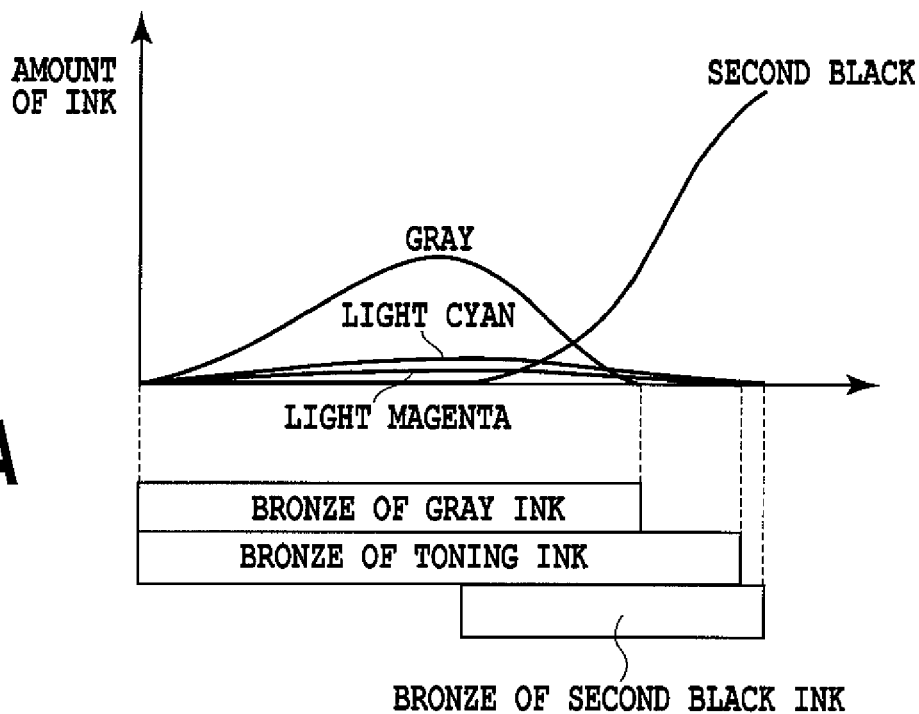
FIGS. 27A and 27B are examples of ink use methods in the monochrome mode of Embodiment 3 of this invention.
Figure 27B:
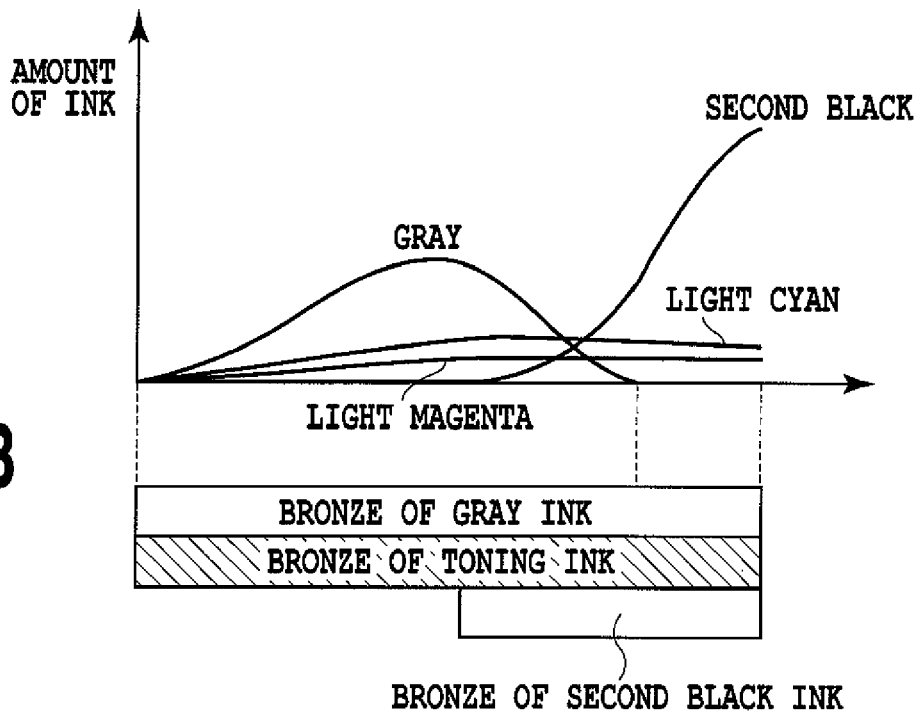

FIG. 27A is a diagram showing a conventional ink use method with respect to the line lattice points connecting the white (W)-black (K). This white (W)-black (K) line is reproduced using gray ink, second black ink and colored inks (light cyan ink and light magenta ink) used for toning. On the other hand, FIG. 27B shows the ink use method in this embodiment.

In FIG. 27A, by using principally gray ink and second black ink and using light cyan and light magenta as toning components, an achromatic color ink is formed in which color change is reduced. Furthermore, the black maximum concentration point is expressed only by the second black ink. As a result, in the area in which gray ink or the inks used for toning are used, bronze of these inks can be seen but when the gray ink and the inks for toning are reduced and second black ink is the only color, a yellow bronze of the second black ink becomes strikingly noticeable. As a result of this, a change in the bronze color is generated at the ink changeover point.

FIG. 27B shows that when using gray ink and inks for toning over the entire area up to the black maximum concentration point, a gray and toning ink bronze is generated over the entire area up to the black maximum concentration point and any change in the bronze color is reduced. Furthermore, in this FIG. 27B, light cyan and light magenta are used over the entire area but the types of ink used over the entire area are not limited to a combination of light cyan ink and light magenta ink. By using at least one color from among gray, light cyan ink and light magenta ink over the entire area a bronze that tends to be the same in the entire area may be generated.

In the ink use method shown in FIG. 27B, when increasing the quantity overall of the light cyan used in the toning ink and expressing a cold tone gray line, by using at least light cyan ink up to the black maximum concentration point it is possible to express an achromatic color line in which bronze color change is also suppressed. Additionally, yellow ink may be added in place of the light cyan ink and even when a warm tone gray line is expressed by increasing the quantity of the yellow ink overall, it is possible to express a gray line in which bronze change is suppressed by using at a minimum yellow ink up to the black maximum concentration point.

(Other)

In the above-described embodiment an explanation was given regarding the instance in which a combination of pigment-based inks having the bronze characteristics shown in FIG. 23 was used but inks that may be used in this invention are not limited to just these. It is also possible to use inks which have different bronze colors (regular reflected light color).

Furthermore, in the above-described embodiment an example in which pigment-based inks were used was described but inks that can be used are not limited to pigment-based inks, dye-based inks may also be used. That is, for those instances when the bronze phenomenon is produced, it is possible to use inks in which bronze unevenness is generated.

Further, an explanation regarding an example of using inks as recording materials was given in the above-described embodiment but applicable recording materials for this invention are not limited to inks. For example, even toners may be used. That is, toners may be used if they have different bronze colors (regular reflected light colors). After all, not only can an inkjet printing method using inks be used, so can electrophotographic methods using toners.

Additionally, the printing system J0011 of the above-described embodiment is composed of the host device J0012 and the printing apparatus J0013 which carries out printing on the printing medium based on the image data produced by the host device J0012. And the characteristic image processing of this invention (color separation processing) is carries out by the host device J0012. However, this invention not only carries out image processing with the host device but also can be used when carrying out image processing with the printing apparatus. When the characteristic image processing of this invention (color separation processing) is carried out by the printing apparatus J0013, the color separation table as shown in FIG. 25 is stored in the ROM of the printing apparatus and in accordance with this color separation table image processing may be carried out. In this case, the printing apparatus carrying out the above-described characteristic image processing comprises this invention.

Additionally, this invention can be carried out by the program codes that actualize the functions of the above-described embodiment or by a printing apparatus in which they are stored. Furthermore, it can be implemented by having a system or device computer (or CPU or MPU) that reads and executes the program codes stored in the memory medium. For this case, by having the program codes themselves read from the memory medium carry out the functions of the above-described embodiment, the memory medium in which these program codes are held or the program codes themselves will implement this invention. Specifically, based on the color separation table shown in FIGS. 25B, 26B and 27B, the programs or the memory medium in which these programs are stored will implement this invention.

As a memory medium that will provide the program codes, it is possible to use, for example, floppy disks (registered trademark), hard disks, optical disks, magneto-optical disks, CD-ROMs, CD-Rs, magnetic tapes, nonvolatile memory cards and ROMs.

Additionally, by executing the program codes read by the computer, not only are the functions of the above-described embodiment carried out, part or all of the actual processing may also be carried out by the OS run on the computer based on their instructions in the program codes.

Furthermore, after the program codes are written into the function expansion board or into the memory provided in a function expansion unit connected to the computer, based on the instructions in these program codes the CPU may carry out part or all of the actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-169087, filed Jun. 19, 2006, which is hereby incorporated by reference herein in its entirety.

What is claimed is:

1. An image processing apparatus, comprising:

processing means for carrying out processing for determining respective amounts of respective recording materials used in reproducing a color defined by color signals, wherein the processing means determines the respective amounts of the respective recording materials used to reproduce the color defined by the color signal in a predetermined color region so that at least one type of the recording materials is used over the entire area of the predetermined color region in which a plurality of types of the recording materials with different regular reflected light colors are used for reproduction, and wherein the plurality of types of recording materials include a first chromatic color recording material and a second chromatic color recording material, and the predetermined color region is a color region between the maximum concentration point due to the first chromatic color recording material and the maximum concentration point due to the second chromatic color recording material, and one type of the recording materials is the first chromatic color recording material.

2. An image processing apparatus, comprising:

processing means for carrying out processing for determining respective amounts of respective recording materials used in reproducing a color defined by color signals, wherein the processing means determines the respective amounts of the respective recording materials used to reproduce the color defined by the color signal in a predetermined color region so that at least one type of the recording materials is used over the entire area of the predetermined color region in which a plurality of types of the recording materials with different regular reflected light colors are used for reproduction, and wherein the plurality of types of recording materials include achromatic color recording material and chromatic color recording material, and the predetermined color region is a color region between the maximum concentration point due to the achromatic color recording material and the white color, and one type of the recording material is the chromatic color recording material.

3. An image processing apparatus, comprising:

processing means for carrying out processing for determining respective amounts of respective recording materials used in reproducing a color defined by color signals, wherein the processing means determines the respective amounts of the respective recording materials used to reproduce the color defined by the color signal in a predetermined color region so that at least one type of the recording materials is used over the entire area of the predetermined color region in which a plurality of types of the recording materials with different regular reflected light colors are used for reproduction, and wherein the plurality of types of recording materials include a first achromatic color recording material and a second achromatic color recording material, and the predetermined color region is a color region between the maximum concentration point due to the achromatic color recording material and the white color, and one type of the recording materials is the first achromatic color recording material.

* * * * *